(12) United States Patent
Yasumatsu et al.

(10) Patent No.: US 11,249,380 B2
(45) Date of Patent: Feb. 15, 2022

(54) LIGHT SOURCE APPARATUS AND PROJECTOR

(71) Applicant: SEIKO EPSON CORPORATION, Tokyo (JP)

(72) Inventors: Wataru Yasumatsu, Azumino (JP); Koichi Akiyama, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/148,632

(22) Filed: Jan. 14, 2021

(65) Prior Publication Data

US 2021/0216004 A1 Jul. 15, 2021

(30) Foreign Application Priority Data

Jan. 14, 2020 (JP) .............................. JP2020-003859

(51) Int. Cl.
*G03B 21/20* (2006.01)
*H04N 9/31* (2006.01)
(Continued)

(52) U.S. Cl.
CPC ....... *G03B 21/2073* (2013.01); *G02B 5/3083* (2013.01); *G02B 27/283* (2013.01); *G02F 1/13362* (2013.01); *G02F 1/133526* (2013.01); *G03B 21/204* (2013.01); *G03B 21/208* (2013.01); *G03B 21/2013* (2013.01);
(Continued)

(58) Field of Classification Search
CPC .............. G03B 21/204; G03B 21/2073; G03B 21/2013; G03B 21/2066; G03B 21/2033; G03B 21/208; H04N 9/3161; H04N 9/3164; H04N 9/3167; H04N 9/3158; H04N 9/3155; G02B 27/283
See application file for complete search history.

(56) References Cited

U.S. PATENT DOCUMENTS 10,444,611 B2 * 10/2019 Pan .......................... G03B 33/06
2003/0090597 A1 5/2003 Katoh et al.
(Continued)

FOREIGN PATENT DOCUMENTS

JP H04-060538 A 2/1992
JP H11-109285 A 4/1999
(Continued)

*Primary Examiner* — Ryan D Howard
(74) *Attorney, Agent, or Firm* — Dority & Manning, P.A.

(57) ABSTRACT

A light source apparatus according to the present disclosure includes a light source section, a first polarization separator that transmits in a first polarization component of the first light and reflects a second polarization component of the first light, a second polarization separator that reflects the first polarization component, a diffuser that diffuses the second polarization component and causes the diffused second polarization component, a first wavelength converter that converts the wavelength of the first polarization component into second light, and a second wavelength converter that is disposed in a position shifted in a fifth direction from a placement plane where the first polarization separator and the second polarization separator are placed, converts the wavelength of the excitation light into third light, and the second polarization separator transmits the first polarization component of the second light and reflects the second polarization component of the second light.

13 Claims, 10 Drawing Sheets

(51) Int. Cl.
   *G02B 27/28*   (2006.01)
   *G02F 1/1335*  (2006.01)
   *G02F 1/13357* (2006.01)
   *G02B 5/30*    (2006.01)

(52) U.S. Cl.
   CPC ....... *G03B 21/2066* (2013.01); *H04N 9/3161* (2013.01); *H04N 9/3164* (2013.01); *H04N 9/3167* (2013.01); *G02F 2201/52* (2013.01)

(56) References Cited

U.S. PATENT DOCUMENTS

| | | |
|---|---|---|
| 2009/0190074 A1 | 7/2009 | Woo et al. |
| 2013/0027670 A1 | 1/2013 | Akiyama et al. |
| 2016/0170260 A1 | 6/2016 | Wachi et al. |

FOREIGN PATENT DOCUMENTS

| | | | |
|---|---|---|---|
| JP | H11-295652 | A | 10/1999 |
| JP | 2000-131762 | A | 5/2000 |
| JP | 2000-147500 | A | 5/2000 |
| JP | 2002-335471 | A | 11/2002 |
| JP | 2005-221885 | A | 8/2005 |
| JP | 2009-157357 | A | 7/2009 |
| JP | 2013-167812 | A | 8/2013 |
| JP | 2015-025835 | A | 2/2015 |

\* cited by examiner

LIGHT SOURCE APPARATUS AND PROJECTOR

The present application is based on, and claims priority from JP Application Serial Number 2020-003859, filed Jan. 14, 2020, the disclosure of which is hereby incorporated by reference herein in its entirety.

BACKGROUND

1. Technical Field

The present disclosure relates to a light source apparatus and a projector.

2. Related Art

There is a known projector that modulates the light outputted from a light source to produce image light based on image information and projects the produced image light. JP-A-4-60538 discloses a projection-type color image display apparatus including a light source, a plurality of dichroic mirrors, a liquid crystal display device including a microlens array, and a projection lens. The projection-type color image display apparatus separates white light outputted from the light source into a plurality of color light fluxes having colors different from one another and causes the plurality of separated color light fluxes to be incident on different sub-pixels in one liquid crystal display device for color display.

In the projection-type color image display apparatus described above, a red light reflecting dichroic mirror, a green light reflecting dichroic mirror, and a blue light reflecting dichroic mirror are disposed in nonparallel to each other along a light incident optical axis of the white light outputted from the light source. The white light outputted from the light source passes through the dichroic mirrors described above, which separate the white light into red light, green light, and blue light that travel in directions different from one another. The red light, the green light, and the blue light are incident on red sub-pixels, green sub-pixels, and blue sub-pixels of a light modulation device with the red light, the green light, and the blue light spatially separated from one another by microlenses provided on the light incident side of the light modulation device.

In the projection-type color image display apparatus disclosed in JP-A-4-60538, a lamp light source, such as a halogen lamp and a xenon lamp, is employed as the white light source, and a liquid crystal display device is employed as the light modulation device. The light outputted from the lamp light source is nonpolarized light, and using the liquid crystal display device as the light modulation device requires the light incident on the liquid crystal display device to be linearly polarized light having a specific polarization direction. On the other hand, as an illuminator that uniformly illuminates the liquid crystal display device, it is conceivable that a pair of multi-lens arrays that divide light incident thereon into a plurality of sub-light fluxes and a polarization converter that aligns the polarization directions of the plurality of sub-light fluxes with one another are provided between the white light source and the liquid crystal display device. In this case, a frequently used polarization converter includes a plurality of polarization separation layers and a plurality of reflection layers alternately arranged along a direction that intersects the light incident direction and phase retardation layers provided in the optical path of the light having passed through the polarization separation layers or the optical path of the light reflected off the reflection layers.

When the size of the projection-type color image display apparatus described above is reduced to meet the need for size reduction in recent years, however, it is difficult to manufacture a polarization converter having a small interval between the polarization separation layers and the reflection layers. It is therefore difficult to reduce the size of a light source apparatus including a polarization converter of this type and in turn the size of a projector including the light source apparatus. In view of the problems described above, it is desired to provide a light source apparatus capable of outputting a plurality of color light fluxes having an aligned polarization direction without using a small-interval polarization converter.

SUMMARY

To solve the problems described above, a light source apparatus according to an aspect of the present disclosure includes a light source section that outputs first light that belongs to a first wavelength band and excitation light that belongs to an excitation wavelength band, a first polarization separator that transmits in a first direction a first polarization component of the first light incident from the light source section along the first direction and reflects a second polarization component of the first light in a second direction that intersects the first direction, a second polarization separator that is disposed in a position shifted in the first direction from the first polarization separator and reflects in the second direction the first polarization component incident from the first polarization separator along the first direction, a diffuser that is disposed in a position shifted in the second direction from the first polarization separator, diffuses the second polarization component incident from the first polarization separator along the second direction, and causes the diffused second polarization component to exit in a third direction opposite the second direction, a first wavelength converter that is disposed in a position shifted in the second direction from the second polarization separator, converts a wavelength of the first polarization component incident from the second polarization separator along the second direction into second light that belongs to a second wavelength band different from the first wavelength band, and causes the second light to exit in the third direction, and a second wavelength converter that is disposed in a position shifted in a fifth direction that intersects the first direction, the second direction, the third direction, and a fourth direction opposite the first direction from a placement plane where the first polarization separator and the second polarization separator are placed, converts a wavelength of the excitation light outputted from the light source section into third light that belongs to a third wavelength band different from the first and second wavelength bands, and causes the third light to exit in the third direction, and the second polarization separator transmits the first polarization component of the second light in the third direction and reflects the second polarization component of the second light in the fourth direction.

The light source apparatus according to the aspect of the present disclosure may further include a third polarization separator that is disposed in a position shifted in the third direction from the second wavelength converter, transmits a fifth polarization component of the third light in the third direction, and reflects a sixth polarization component of the third light in the fourth direction, and a first color separator that is disposed in a position shifted in the fourth direction from the third polarization separator, transmits the excitation light outputted from the light source section, and reflects the sixth polarization component that exits out of the third polarization separator.

The light source apparatus according to the aspect of the present disclosure may further include a second color separator that is disposed in a position shifted in the third direction from the first polarization separator and separates the light that exits out of the first polarization separator into the second polarization component that belong to the first wavelength band and the fourth polarization component that belong to the second wavelength band.

The light source apparatus according to the aspect of the present disclosure may further include a light combiner that is disposed in a position shifted in the fifth direction from the second color separator, combines the fourth polarization component that exits out of the second color separator and the sixth polarization component that exits out of the first color separator, and outputs light containing the second light.

In the light source apparatus according to the aspect of the present disclosure, the light source section may include a first light emitter that outputs the first light that belongs to the first wavelength band and a second light emitter that outputs the excitation light that belongs to the excitation wavelength band.

In the light source apparatus according to the aspect of the present disclosure, the first wavelength band and the excitation wavelength band may be the same wavelength band.

The light source apparatus according to the aspect of the present disclosure may further include a first phase retarder on which the first light outputted from the first light emitter is incident and via which the first light containing the first polarization component and the second polarization component exits.

In the light source apparatus according to the aspect of the present disclosure, the first phase retarder may be rotatable around an axis of rotation along a traveling direction of the light incident on the first phase retarder.

The light source apparatus according to the aspect of the present disclosure may further include a second phase retarder which is provided between the first polarization separator and the diffuser and on which the second polarization component is incident from the first polarization separator.

The light source apparatus according to the aspect of the present disclosure may further include a third phase retarder that converts the third polarization component that exits out of the second polarization separator in the third direction into the fourth polarization component.

A projector according to another aspect of the present disclosure includes the light source apparatus according to the aspect of the present disclosure, a light modulator that modulates light from the light source apparatus in accordance with image information, and a projection optical apparatus that projects the light modulated by the light modulator.

The projector according to the aspect of the present disclosure may further include a homogenizer provided between the light source apparatus and the light modulator, and the homogenizer may include two multi-lenses that divide the light incident from the light source apparatus into a plurality of sub-light fluxes, and a superimposing lens that superimposes the plurality of sub-light fluxes incident from the two multi-lenses on one another on the light modulator.

In the projector according to the aspect of the present disclosure, the light modulator has a plurality of pixels, the plurality of pixels may each have a first sub-pixel, a second sub-pixel, a third sub-pixel, and a fourth sub-pixel, and the first light may be incident on the first sub-pixel, light containing the second light may be incident on the second sub-pixel, the second light may be incident on the third sub-pixel, and the third light may be incident on the fourth sub-pixel in each of the plurality of pixels.

DESCRIPTION OF EXEMPLARY EMBODIMENTS

First Embodiment

A first embodiment of the present disclosure will be described below with reference to FIGS. 1 to 7.

Figure 1:
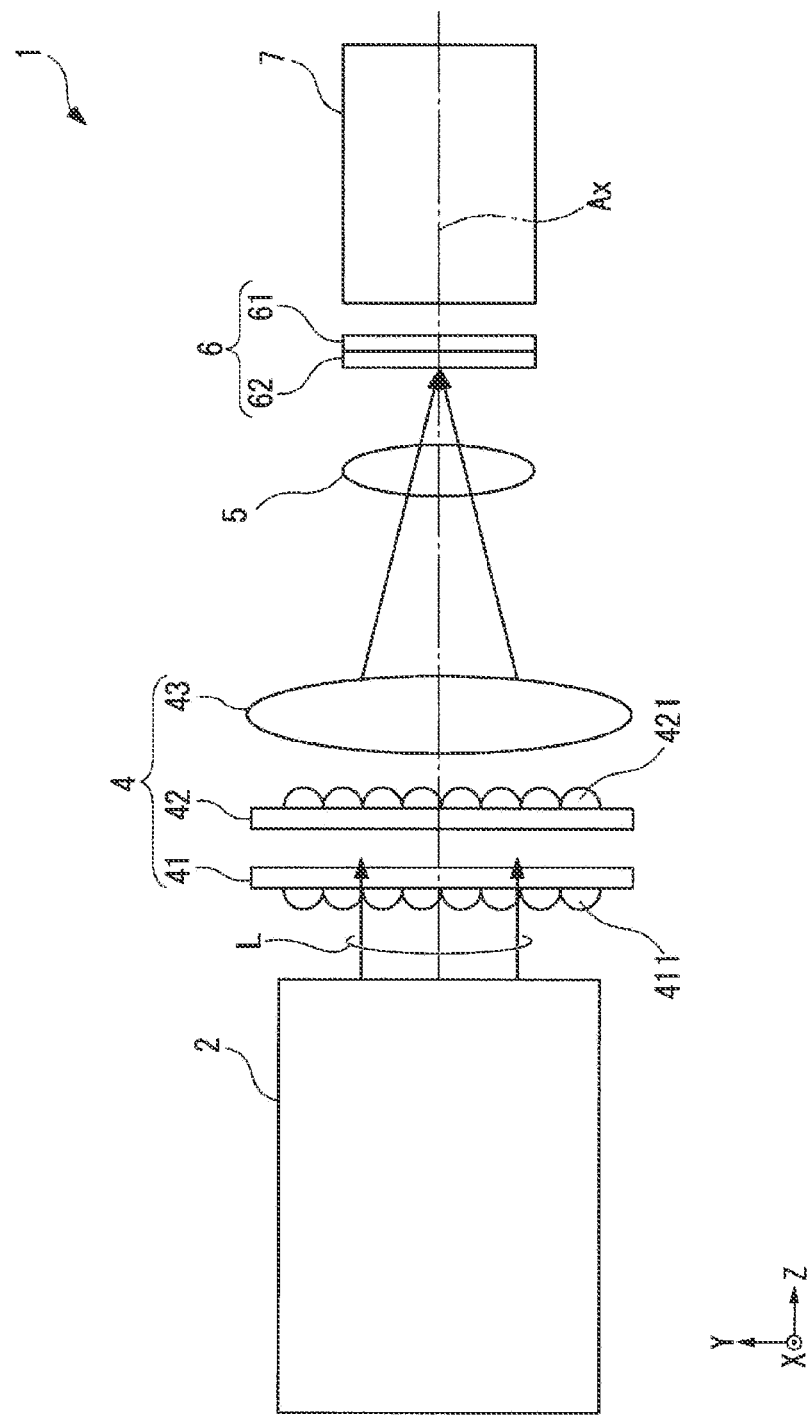
FIG. 1 is a schematic configuration diagram of a projector according to a first embodiment.

FIG. 1 is a schematic configuration diagram of a projector 1 according to the present embodiment.

In the following drawings, components are drawn at different dimensional scales in some cases for clarity of each of the components.

The projector 1 according to the present embodiment modulates light outputted from a light source apparatus 2 to form an image according to image information and enlarges and projects the formed image on a projection receiving surface, such as a screen. In other words, the projector 1 causes a light modulator 6 including one liquid crystal panel 61 to modulate the light outputted from the light source apparatus 2 to form an image and projects the formed image. The projector 1 is what is called a single-panel projector.

The projector 1 includes the light source apparatus 2, a homogenizer 4, a field lens 5, the light modulator 6, and a projection optical apparatus 7, as shown in FIG. 1. The light source apparatus 2, the homogenizer 4, the field lens 5, the light modulator 6, and the projection optical apparatus 7 are disposed in predetermined positions along an illumination optical axis Ax. The illumination optical axis Ax is defined as an axis along the traveling direction of the chief ray of light L outputted from the light source apparatus 2.

The configurations of the light source apparatus 2 and the homogenizer 4 will be described later in detail.

The field lens 5 is disposed between the homogenizer 4 and the light modulator 6. The field lens 5 parallelizes the light L having exited out of the homogenizer 4 and guides the parallelized light L to the light modulator 6.

The projection optical apparatus 7 projects the light modulated by the light modulator 6, that is, image forming light on a projection receiving surface (not shown), such as a screen. The projection optical apparatus 7 includes one or more projection lenses.

In the following description, an axis parallel to the traveling direction of the light outputted from the light source apparatus 2 along the illumination optical axis Ax is called an axis Z, and the traveling direction of the light is called a direction +Z. Two axes perpendicular to the axis Z and perpendicular to each other are called axes X and Y. Out of the directions along the axes described above, the upward direction of the vertical direction in the space where the projector 1 is installed is called a direction +Y. The rightward direction of the horizontal direction when a target object on which the light is incident along the direction +Z is so viewed that the direction +Y coincides with the upward direction of the vertical direction is called a direction +X. Although not shown, the direction opposite the direction +X is called a direction −X, the direction opposite the direction +Y is called a direction −Y, and the direction opposite the direction +Z is called a direction −Z.

The direction +X in the present embodiment corresponds to the first direction in the appended claims. The direction −Z in the present embodiment corresponds to the second direction in the appended claims. The direction +Z in the present embodiment corresponds to the third direction in the appended claims. The direction −X in the present embodiment corresponds to the fourth direction in the appended claims. The direction −Y in the present embodiment corresponds to the fifth direction in the appended claims.

Configuration of Light Source Apparatus

Figure 2:
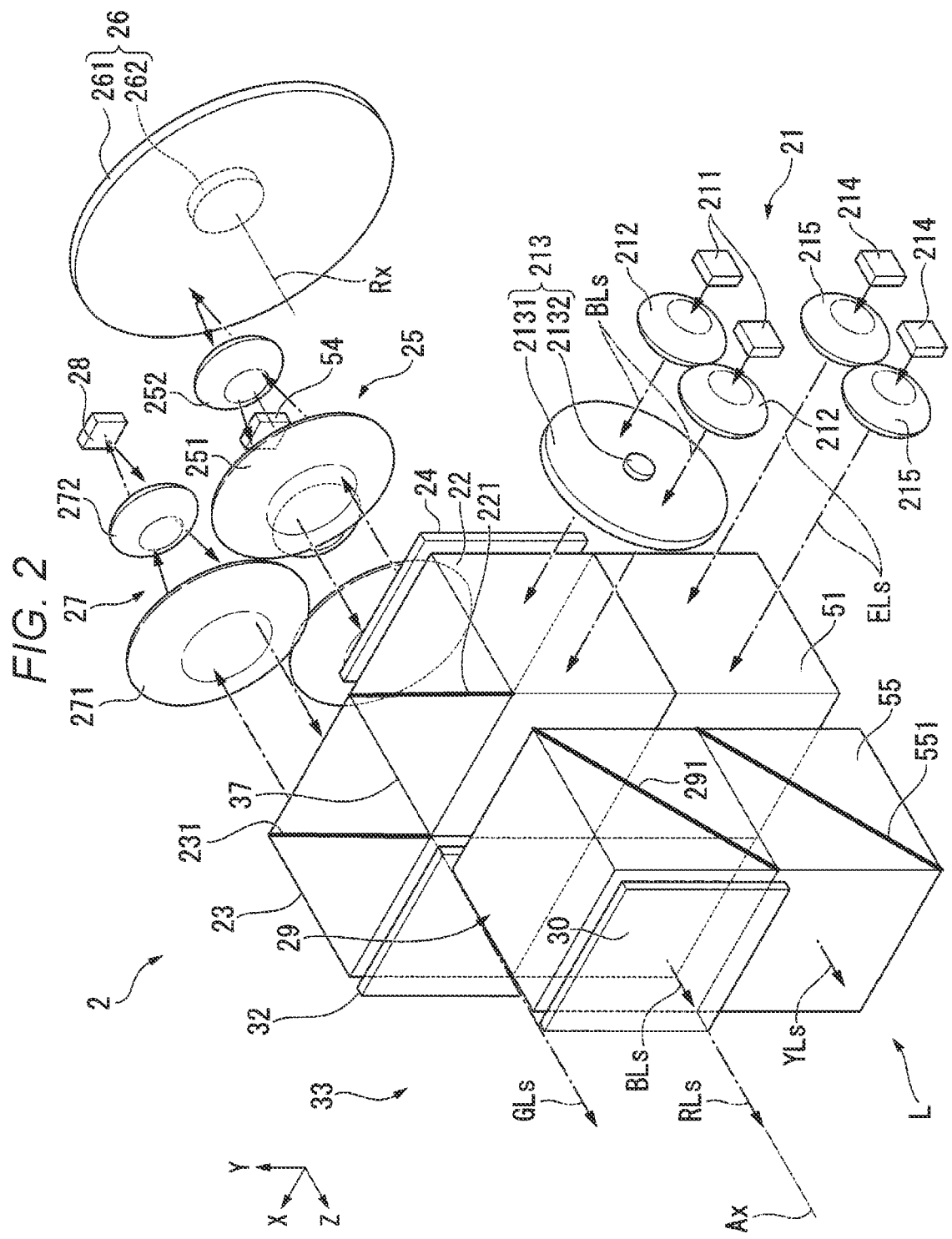
FIG. 2 is a perspective view of a light source apparatus according to the first embodiment.
Figure 3:
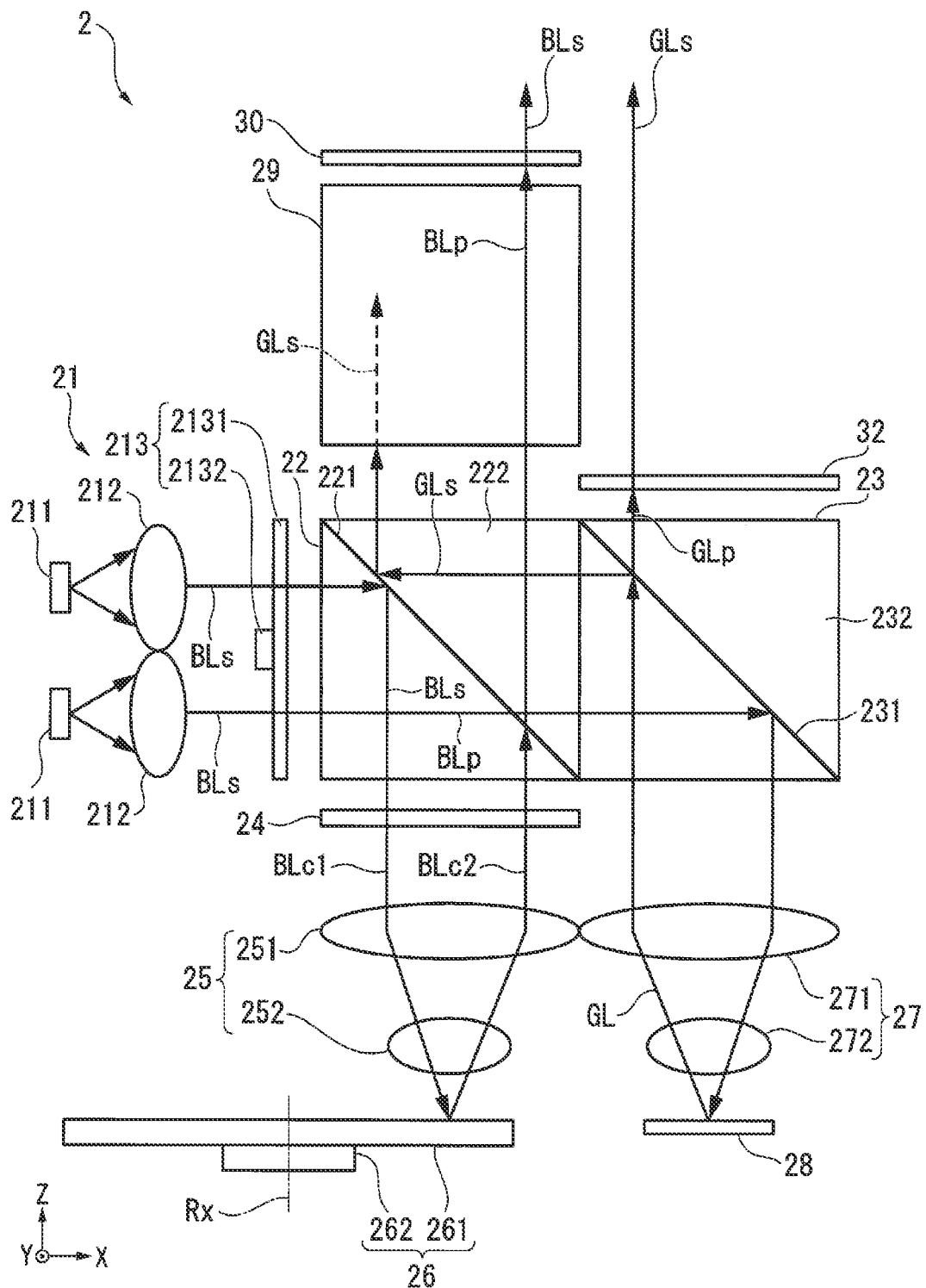
FIG. 3 is a plan view of components of the light source apparatus that are located along the path of the light from first light emitters and viewed from the positive side of a direction Y.
Figure 4:
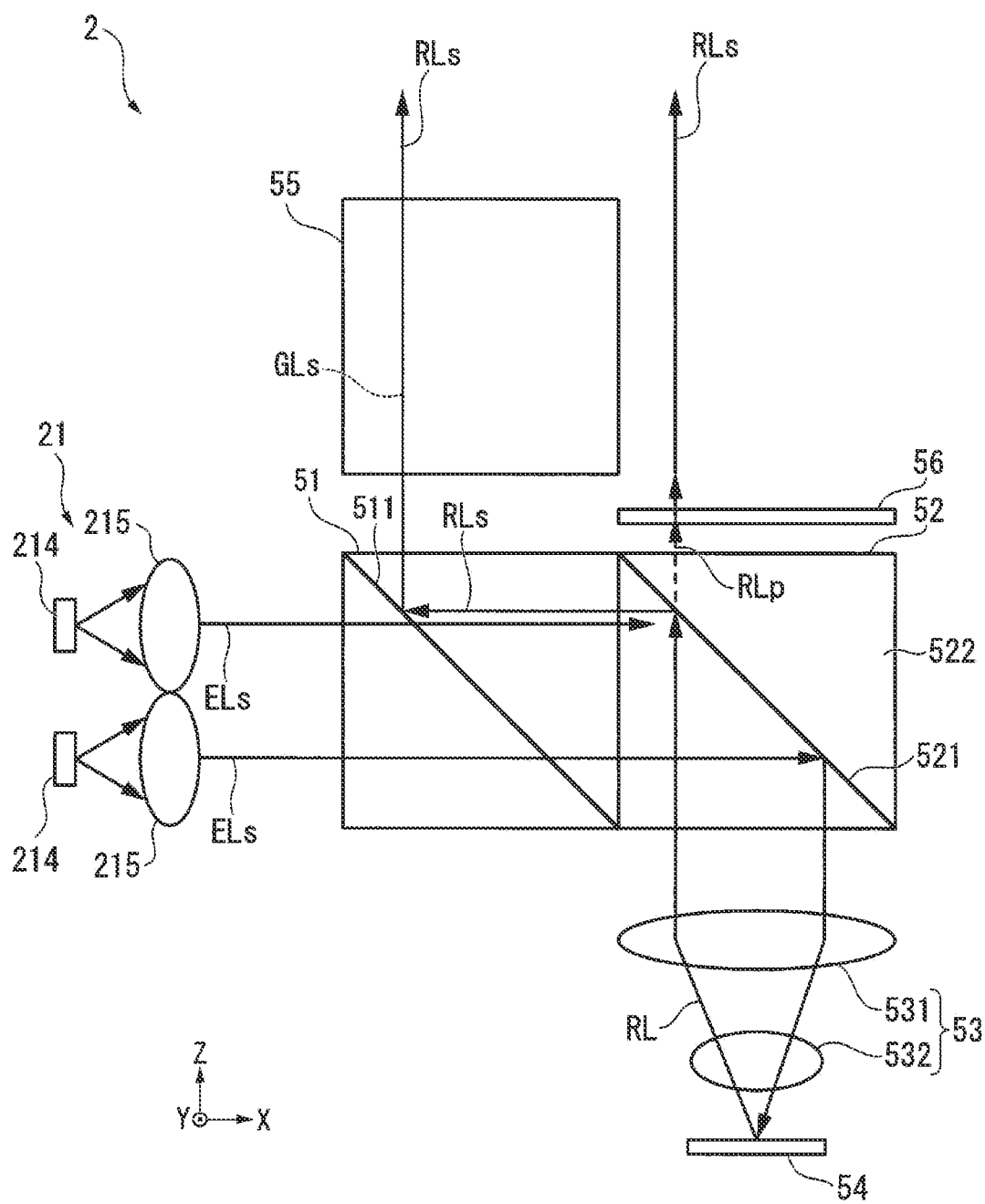
FIG. 4 is a plan view of components of the light source apparatus that are located along the path of the light from second light emitters and viewed from the positive side of the direction Y.

FIG. 2 is a perspective view of the light source apparatus 2 according to the present embodiment. FIG. 3 is a plan view of components of the light source apparatus 2 that are located along the path of the light from first light emitters and viewed from the positive side of the direction Y. FIG. 4 is a plan view of components of the light source apparatus 2 that are located along the path of the light from second light emitters and viewed from the positive side of the direction Y.

The light source apparatus 2 has a configuration in which the components on the upper side shown in FIG. 3 are stacked above the components on the lower side shown in FIG. 4. Therefore, in other words, FIG. 3 is a plan view of the components on the upper side viewed from the positive side of the direction Y, and FIG. 4 is a plan view of the components on the lower side viewed from the positive side of the direction Y.

The light source apparatus 2 outputs the light L, with which the light modulator 6 is illuminated, in the direction parallel to the illumination optical axis Ax, that is, in the direction +Z, as shown in FIGS. 2 to 4. The light L outputted by the light source apparatus 2 is linearly polarized light having an aligned polarization direction and contains a plurality of spatially separate color light fluxes. In the present embodiment, the light L outputted by the light source apparatus 2 is formed of four light fluxes each formed of S-polarized light. The four light fluxes are formed of blue light BLs, yellow light YLs, green light GLs, and red light RLs.

The light source apparatus 2 includes a light source section 21, a first polarization separator 22, a second polarization separator 23, a second phase retarder 24, a first light collector 25, a diffusion apparatus 26, a second light collector 27, a first wavelength converter 28, a first color separator 51, a third polarization separator 52, a third light collector 53, a second wavelength converter 54, a second color separator 29, a light combiner 55, a third phase retarder 32, a fourth phase retarder 56, and a fifth phase retarder 30.

A P-polarization component in the present embodiment corresponds to the first polarization component in the appended claims, and an S-polarization component in the present embodiment corresponds to the second polarization component in the appended claims. Further, the first polarization separator 22, the second polarization separator 23, and the third polarization separator 52 differ from the second color separator 29 and the light combiner 55 in terms of the orientation of films that separate the polarization components or the color light fluxes from each other. Therefore, the P-polarization component and the S-polarization component stand for the polarization directions with respect to the first polarization separator 22, the second polarization separator 23, and the third polarization separator 52, and the polarization directions are reversed in the second color separator 29 and the light combiner 55. That is, the P-polarization component with respect to the first polarization separator 22, the second polarization separator 23, and the third polarization separator 52 is the S-polarization component with respect to the second color separator 29 and the light combiner 55, and the S-polarization component with respect to the first polarization separator 22, the second polarization separator 23, and the third polarization separator 52 is the P-polarization component with respect to the second color separator 29 and the light combiner 55. It is, however, noted that the P-polarization component and the S-polarization component hereinafter stand for the polarization directions with respect to the first polarization separator 22, the second polarization separator 23, and the third polarization separator 52 to avoid confused description.

Configuration of Light Source Section

The light source section 21 outputs blue light BLs, which enters the first polarization separator 22, and excitation light ELs, which enters the first color separator 51, along the direction +X. The light source section 21 includes a plurality of first light emitters 211, a plurality of first collimator lenses 212, a rotary phase retardation apparatus 213, a plurality of second light emitters 214, a plurality of second collimator lenses 215.

The first light emitters 211 are each formed of a solid-state light source that outputs the blue light BLs. Specifically, the first light emitters 211 are each formed of a semiconductor laser that outputs S-polarized blue light BLs. The blue light BLs is laser light that belongs to a blue wavelength band, for example, from 440 to 480 nm and has a peak wavelength that falls within, for example, a range from 450 to 460 nm. That is, the light source section 21 outputs blue light BLs that belongs to the blue wavelength band.

The plurality of first light emitters 211 are arranged along the axis Z, as shown in FIG. 3. The light source section 21 in the present embodiment includes two first light emitters 211, but the number of first light emitters 211 is not limited to a specific number and may be one. The arrangement of the plurality of first light emitters 211 is also not limited to a specific arrangement. The first light emitters 211 are so disposed as to output the blue light BLs formed of the S-polarized component and may instead be so disposed as to output blue light formed of the P-polarized component because the rotary phase retardation apparatus 213, which will be described later, can arbitrarily set the ratio between the amount of S-polarized light and the amount of P-polarized light. That is, the first light emitters 211 may be rotated by 90° around the optical axis of the outputted light.

The blue light BLs that belongs to the blue wavelength band in the present embodiment corresponds to the first light that belongs to a first wavelength band in the appended claims.

The plurality of first collimator lenses 212 are provided between the plurality of first light emitters 211 and the rotary phase retardation apparatus 213. The first collimator lenses 212 are provided in correspondence with the respective first light emitters 211. The first collimator lenses 212 parallelize the light L outputted from the first light emitters 211.

The rotary phase retardation apparatus 213 includes a first phase retarder 2131 and a rotator 2132. The first phase retarder 2131 is rotatable around an axis of rotation along the traveling direction of the light incident on the first phase retarder 2131, that is, an axis of rotation parallel to the axis X. The rotator 2132 is formed, for example, of a motor and rotates the first phase retarder 2131.

The first phase retarder 2131 is formed of a half wave plate or a quarter wave plate for the blue wavelength band. Part of the blue light BLs formed of the S-polarized component having entered the first phase retarder 2131 is converted by the first phase retarder 2131 into blue light BLp formed of the P-polarized component. The blue light having passed through the first phase retarder 2131 is therefore the mixture of the blue light BLs formed of the S-polarized component and the blue light BLp formed of the P-polarized component mixed at a predetermined ratio. That is, the first phase retarder 2131 receives the blue light BLs outputted from the light emitters 211 and outputs the blue light containing the blue light BLs formed of the S-polarized component and the blue light BLp formed of the P-polarized component.

The rotator 2132 adjusts the angle of rotation of the first phase retarder 2131 to adjust the ratio between the amount of blue light BLs formed of the S-polarized component and the amount of blue light BLp formed of the P-polarized component contained in the light that passes through the first phase retarder 2131. The rotator 2132, which rotates the first phase retarder 2131, may not be provided when no adjustment of the ratio between the amount of blue light BLs and the amount of blue light BLp is necessary. In this case, the angle of rotation of the first phase retarder 2131 is so set that the ratio between the amount of blue light BLs and the amount of blue light BLp is a preset ratio, and the rotary position of the first phase retarder 2131 is then fixed.

The light source section 21 thus outputs the light containing the blue light BLs formed of the S-polarized component and the blue light BLp formed of the P-polarized component. In the present embodiment, the plurality of first light emitters 211 are all configured to output the blue light BLs formed of the S-polarized component, and a light emitter 211 that outputs the blue light BLs formed of the S-polarized component and a light emitter 211 that outputs the blue light BLp formed of the P-polarized component may be mixed with each other. According to the configuration described above, the rotary phase retardation apparatus 213 can be omitted. Further, the first light emitters 211 are not necessarily each formed of a semiconductor laser and may each be formed of another solid-state light source, such as an LED (light emitting diode).

The second light emitters 214 are each formed of a solid-state light source that outputs the excitation light ELs. Specifically, the second light emitters 214 are each formed of a semiconductor laser that outputs S-polarized excitation light ELs. The excitation light ELs is laser light that belongs to an excitation wavelength band, for example, from 440 to 480 nm and has a peak wavelength that falls within, for example, a range from 450 to 460 nm. In the present embodiment, the blue wavelength band of the light outputted from the first light emitters 211 and the excitation wavelength band of the light outputted from the second light emitters 214 are the same wavelength band. In this case, the first light emitters 211 and the second light emitters 214 can be formed of the same semiconductor lasers. The blue wavelength band of the light from the first light emitters 211 and the excitation wavelength band of the light from the second light emitters 214 may be changed in accordance with the excitation wavelengths at which phosphors contained in the first and second wavelength converters are excited and may differ from each other.

The plurality of second light emitters 214 are arranged along the axis Z, as shown in FIG. 4. The light source section 21 in the present embodiment includes two second light emitters 214, but the number of second light emitters 214 is not limited to a specific number and may be one. The arrangement of the plurality of second light emitters 214 is also not limited to a specific arrangement. The number of first light emitters 211 and the number of second light emitters 214 may differ from each other, and the arrangement of the first light emitters 211 and the arrangement of the second light emitters 214 may differ from each other.

The plurality of second collimator lenses 215 are provided between the plurality of second light emitters 214 and the first color separator 51. The second collimator lenses 215 are provided in correspondence with the respective second light emitters 214. The second collimator lenses 215 parallelize the light L outputted from the second light emitters 214.

Since the excitation light ELs outputted from the second light emitters 214 does not pass through the first phase retarder 2131, the polarization state of the excitation light ELs does not change after outputted from the second light emitters 214, and the excitation light ELs enters the first color separate 51 with the same polarization state. Further, the second light emitters 214 are not necessarily each formed of a semiconductor laser and may each be formed of another solid-state light source, such as an LED.

Configuration of First Polarization Separator

The light containing the blue light BLs formed of the S-polarized component and the blue light BLp formed of the P-polarized component enters the first polarization separator 22 along the direction +X, as shown in FIG. 3. The first polarization separator 22 is formed of a prism-shaped polarization separator. The first polarization separator 22 includes a first polarization separation layer 221 and two first bases 222, which are so provided as to sandwich the first polarization separation layer 221. Specifically, the two first bases 222 each have the shape of a substantially right-angled isosceles triangular column. The two first bases 222 are combined with each other with the inclining surfaces thereof facing each other to form a substantially box-like shape as a whole. The first polarization separation layer 221 is provided between the inclining surfaces of the two first bases 222. The first polarization separation layer 221 therefore inclines by 45° with respect to the axes X and Z. In other words, the first polarization separation layer 221 inclines by 45° with respect to the planes XY and YZ.

The first polarization separation layer 221 has a wavelength selective polarization separation characteristic that causes the first polarization separation layer 221 to transmit the P-polarized component and reflect the S-polarized component of light that belongs to the blue wavelength band and reflect light that belongs to a green wavelength band irrespective of the polarization state of the light. The first polarization separator 22 therefore transmits along the direction +X the blue light BLp formed of the P-polarized component out of the blue light incident on the first polarization separator 22 along the direction +X and reflects along the direction −Z the blue light BLs formed of the S-polarized component out of the incident blue light. The first polarization separation layer 221 is formed, for example, of a dielectric multilayer film. The first bases 222 are made of typical optical glass.

The blue light BLp formed of the P-polarized component in the present embodiment corresponds to the first polarization component in the appended claims, and the blue light BLs formed of the S-polarized component in the present embodiment corresponds to the second polarization component in the appended claims.

Configuration of Second Polarization Separator

The second polarization separator 23 is disposed in a position shifted in the direction +X from the first polarization separator 22. The blue light BLp formed of the P-polarized component having passed through the first polarization separator 22 enters the second polarization separator 23. The second polarization separator 23 is formed of a prism-shaped polarization separator, as the first polarization separator 22 is. The second polarization separator 23 includes a second polarization separation layer 231 and two second bases 232, which are so provided as to sandwich the second polarization separation layer 231.

Specifically, the two second bases 232 each have the shape of a substantially right-angled isosceles triangular column. The two second bases 232 are combined with each other with the inclining surfaces thereof facing each other to form a substantially box-like shape as a whole. The second polarization separation layer 231 is provided between the inclining surfaces of the two second bases 232. The second polarization separation layer 231 inclines by 450 with respect to the axes X and Z. In other words, the second polarization separation layer 231 inclines by 45° with respect to the planes XY and YZ. The second polarization separation layer 231 is disposed in parallel to the first polarization separation layer 221.

The second polarization separation layer 231 has a wavelength selective polarization separation characteristic that causes the second polarization separation layer 231 to reflect light that belongs to the blue wavelength band irrespective of the polarization state of the light and transmit the P-polarized component and reflect the S-polarized component of light that belongs to the green wavelength band. The second polarization separator 23 therefore reflects in the direction −Z the blue light BLs formed of the S-polarized component incident from the first polarization separator 22. The second polarization separation layer 231 is formed, for example, of a dielectric multilayer film. The second bases 232 are made of typical optical glass.

In the present embodiment, the first polarization separator 22 and the second polarization separator 23 are configured to be separate members. The first polarization separator 22 and the second polarization separator 23 are therefore bonded to each other via a bonding material that is not shown but is provided between surfaces of the polarization separators that are the surfaces facing each other. The first polarization separator 22 and the second polarization separator 23 may instead be integrated with each other. That is, the first base 222 adjacent to the second polarization separator 23 and the second base 232 adjacent to the first polarization separator 22 may be a common member made of a single material.

Configuration of Second Phase Retarder

The second phase retarder 24 is disposed in a position shifted in the direction −Z from the first polarization separator 22. That is, the second phase retarder 24 is disposed between the first polarization separator 22 and the diffusion apparatus 26 along the axis Z. The second phase retarder 24 is formed of a quarter wave plate for the blue wavelength band of the blue light BLs incident thereon. The blue light BLs formed of the S-polarized component reflected off the first polarization separator 22 passes through the second phase retarder 24, which converts the blue light BLs, for example, into right-handed circularly polarized blue light BLc1, which then exits out of the second phase retarder 24 toward the first light collector 25. That is, the second phase retarder 24 converts the polarization state of the blue light BLs incident thereon.

Configuration of First Light Collector

The first light collector 25 is disposed in a position shifted in the direction −Z from the second phase retarder 24. That is, the first light collector 25 is disposed between the second phase retarder 24 and the diffusion apparatus 26 along the axis Z. The first light collector 25 collects the blue light BLc1 incident from the second phase retarder 24 into a spot on a diffusion plate 261 of the diffusion apparatus 26. Further, the first light collector 25 parallelizes blue light Blc2, which will be described later and is incident from the diffusion apparatus 26. In the example shown in FIGS. 2 and 3, the first light collector 25 is formed of a first lens 251 and a second lens 252, but the number of lenses that form the first light collector 25 is not limited to a specific number.

Configuration of Diffusion Apparatus

The diffusion apparatus 26 is disposed in a position shifted in the direction −Z from the first light collector 25. That is, the diffusion apparatus 26 is disposed in a position shifted in the direction −Z from the first polarization separator 22. The diffusion apparatus 26 diffusively reflects and outputs in the direction +Z the blue light BLc1 incident in the direction −Z from the first light collector 25 at the same angle of diffusion as that of yellow light YL emitted from the wavelength converter 28. The diffusion apparatus 26 includes the diffusion plate 261 and a rotator 262. The diffusion plate 261 preferably has a reflection characteristic as close as possible to the Lambert scattering characteristic and reflects the blue light BLc1 incident on the reflection plate 261 over a wide angular range. The rotator 262 is formed, for example, of a motor and rotates the diffusion plate 261 around an axis of rotation Rx parallel to the direction +Z.

The diffusion plate 261 in the present embodiment corresponds to the diffuser in the appended claims.

The blue light BLc1 incident on the diffusion plate 261 is converted, when reflected off the diffusion plate 261, into the blue light BLc2, which is circularly polarized light having a polarization rotation direction opposite the polarization rotation direction of the incident blue light BLc1. That is, the right-handed circularly polarized blue light BLc1 is converted by the diffusion plate 261 into the left-handed circularly polarized blue light BLc2. The blue light Blc2 outputted from the diffusion apparatus 26 passes in the direction +Z through the first light collector 25 and then enters the second phase retarder 24 again. In this process, the blue light BLc2 that enters the second phase retarder 24 is converted by the second phase retarder 24 into the blue light BLp formed of the P-polarized component. The converted blue light BLp passes through the first polarization separator 22 in the direction +Z and enters the second color separator 29.

Configuration of Second Light Collector

The second light collector 27 is disposed in a position shifted in the direction −Z from the second polarization separator 23. That is, the second light collector 27 is disposed between the second polarization separator 23 and the first wavelength converter 28 along the axis Z. The second light collector 27 collects the blue light BLp reflected off the second polarization separator 23 into a spot on the first wavelength converter 28. Further, the second light collector 27 parallelizes green light GL, which is emitted from the first wavelength converter 28 and will be described later, and causes the parallelized green light GL to exit out of the second light collector 27 toward the second polarization separator 23. In the example shown in FIG. 3, the second light collector 27 is formed of a first lens 271 and a second lens 272, but the number of lenses that form the second light collector 27 is not limited to a specific number.

Configuration of First Wavelength Converter

The first wavelength converter 28 is disposed in a position shifted in the direction −Z from the second light collector 27. That is, the first wavelength converter 28 is disposed in a position shifted in the direction −Z from the second polarization separator 23. The first wavelength converter 28 is formed of a reflective wavelength converter that is excited with light incident thereon and emits light having a wavelength different from the wavelength of the incident light in the direction opposite the light incident direction. In other words, the first wavelength converter 28 converts the wavelength of the incident light and emits the light converted in terms of wavelength in the direction opposite the light incident direction.

In the present embodiment, the first wavelength converter 28 contains a green phosphor that emits light that belongs to the green wavelength band when excited with light that belongs to the blue wavelength band. Specifically, the first wavelength converter 28 contains a phosphor material, for example, $Lu_3Al_5O_{12}:Ce^{3+}$-based phosphor, $Y_3O_4:Eu^{2+}$-based phosphor, $(Ba,Sr)_2SiO_4:Eu^{2+}$-based phosphor, $Ba_3Si_6O_{12}N_2:Eu^{2+}$-based phosphor, and $(Si,Al)_6(O,N)_8:Eu^{2+}$-based phosphor. The first wavelength converter 28 emits in the direction +Z fluorescence that belongs to the green wavelength band formed of wavelengths longer than those in the blue wavelength band to which the blue light BLp, which is incident on the first wavelength converter 28 along the direction −Z, belongs, that is, nonpolarized green light GL. The green light GL belongs, for example, to a wavelength band from 500 to 570 nm.

The green light GL in the present embodiment corresponds to the second light that belongs to a second wavelength band in the appended claims.

The green light GL emitted from the first wavelength converter 28 passes along the direction +Z through the second light collector 27, which parallelizes the green light GL, and the parallelized green light GL then enters the second polarization separator 23. An immobile wavelength converter is used as the first wavelength converter 28 in the present embodiment, and the configuration described above may be replaced with a configuration using a rotary wavelength converter including a rotator that rotates the first wavelength converter 28 around an axis of rotation parallel to the axis Z. In this case, an increase in temperature of the first wavelength converter 28 is suppressed, whereby the wavelength conversion efficiency of the first wavelength converter 28 can be increased.

The second polarization separation layer 231 of the second polarization separator 23 has the polarization separation characteristic that causes the second polarization separation layer 231 to reflect the S-polarized component of light that belongs to the green wavelength band and transmits the P-polarized component thereof, as described above. Therefore, out of the nonpolarized green light GL incident on the second polarization separation layer 231, green light GLs formed of the S-polarized component is reflected off the second polarization separation layer 231 in the direction −X and enters the first polarization separator 22. The first polarization separation layer 221 of the first polarization separator 22 is so characterized as to reflect light that belongs to the green wavelength band irrespective of the polarization state thereof, as described above. The green light GLs incident on the first polarization separation layer 221 along the direction −X is therefore reflected off the first polarization separator 22 in the direction +Z and enters the second color separator 29.

On the other hand, out of the nonpolarized green light GL incident on the second polarization separation layer 231, green light GLp formed of the P-polarized component passes through the second polarization separation layer 231 in the direction +Z, exits out of the second polarization separator 23, and enters the third phase retarder 32.

The green light GLp formed of the P-polarized component in the present embodiment corresponds to the third polarization component in the appended claims, and the green light GLs formed of the S-polarized component in the present embodiment corresponds to the fourth polarization component in the appended claims.

Configuration of Third Phase Retarder

The third phase retarder 32 is disposed in a position shifted in the direction +Z from the second polarization separator 23. In other words, the third phase retarder 32 is disposed in the optical path of the green light GLp that exits out of the second polarization separator 23. The third phase retarder 32 is formed of a half wave plate for the green wavelength band to which the green light GLp incident on the third phase retarder 32 belongs. The third phase retarder 32 converts the green light GLp incident from the second polarization separator 23 into the green light GLs formed of the S-polarized component. The green light GLs converted by the third phase retarder 32 and therefore formed of the S-polarized component is outputted from the light source apparatus 2 in the direction +Z and enters the homogenizer 4 shown in FIG. 1. The third phase retarder 32 may instead be so provided as to be in contact with a surface of the second polarization separator 23 that is the surface via which the green light GLp exits.

Configuration of First Color Separator

The first color separator 51 is disposed in a position shifted in the direction −X from the third polarization separator 52 and shifted in the direction −Y from the first polarization separator 22, as shown in FIG. 4. The first color separator 51 is formed of a dichroic prism including a color separation layer 511, which transmits light that belongs to the blue wavelength band and reflects light that belongs to a red wavelength band. The excitation light ELs outputted from the second light emitters 214 passes through the color separation layer 511 in the direction +X and enters the third polarization separator 52. The color separation layer 511 inclines by 45° with respect to the axes X and Z. In other words, the color separation layer 511 inclines by 45° with respect to the planes XY and YZ.

Configuration of Third Polarization Separator

The third polarization separator 52 is disposed in a position shifted in the direction +X from the first color separator 51 and in a position shifted in the direction −Y from the second polarization separator 23. The excitation light ELs having passed through the first color separator 51 enters the third polarization separator 52. The third polarization separator 52 is formed of a prism-shaped polarization separator, as the first polarization separator 22 and the second polarization separator 23 are. The third polarization separator 52 includes a third polarization separation layer 521 and two third bases 522, which are so provided as to sandwich the third polarization separation layer 521.

Specifically, the two third bases 522 each have the shape of a substantially right-angled isosceles triangular column. The two third bases 522 are combined with each other with the inclining surfaces thereof facing each other to form a substantially box-like shape as a whole. The third polarization separation layer 521 is provided between the inclining surfaces of the two third bases 522. The third polarization separation layer 521 inclines by 450 with respect to the axes X and Z. In other words, the third polarization separation layer 521 inclines by 45° with respect to the planes XY and YZ. The third polarization separation layer 521 is disposed in parallel to the color separation layer 511.

The third polarization separation layer 521 has a wavelength selective polarization separation characteristic that causes the third polarization separation layer 521 to reflect light that belongs to the blue wavelength band irrespective of the polarization state of the light and transmit the P-polarized component and reflect the S-polarized component of light that belongs to the red wavelength band. The third polarization separator 52 therefore reflects in the direction −Z the excitation light ELs formed of the S-polarized component incident from the first color separator 51. The third polarization separation layer 521 is formed, for example, of a dielectric multilayer film. The third bases 522 are made of typical optical glass.

Configuration of Third Light Collector

The third light collector 53 is disposed in a position shifted in the direction −Z from the third polarization separator 52. That is, the third light collector 53 is disposed between the third polarization separator 52 and the second wavelength converter 54 along the axis Z. The third light collector 53 collects the excitation light ELs reflected off the third polarization separator 52 into a spot on the second wavelength converter 54. Further, the third light collector 53 parallelizes red light RL, which is emitted from the second wavelength converter 54 and will be described later, and causes the parallelized red light RL to exit out of the third light collector 53 toward the third polarization separator 52. In the example shown in FIG. 4, the third light collector 53 is formed of a first lens 531 and a second lens 532, but the number of lenses that form the third light collector 53 is not limited to a specific number.

Configuration of Second Wavelength Converter

The second wavelength converter 54 is disposed in a position shifted in the direction −Z from the third light collector 53. That is, the second wavelength converter 54 is disposed in a position shifted in the direction −Z from the third polarization separator 52. The second wavelength converter 54 is formed of a reflective wavelength converter that is excited with light incident thereon and emits light having a wavelength different from the wavelength of the incident light in the direction opposite the light incident direction. In other words, the second wavelength converter 54 converts the wavelength of the incident light and emits the light converted in terms of wavelength in the direction opposite the light incident direction.

The second wavelength converter 54 is disposed in a position shifted in the direction −Y from the first wavelength converter 28. That is, the second wavelength converter 54 is disposed below the first wavelength converter 28 in the vertical direction. The second wavelength converter 54 may not, however, necessarily be disposed below the first wavelength converter 28 in the vertical direction and may, for example, be disposed obliquely below the first wavelength converter 28. That is, the second wavelength converter 54 only needs to be disposed in a position shifted in the direction −Y from the placement plane where the first polarization separator 22 and the second polarization separator 23 are placed. The placement plane described above is defined as an imaginary plane parallel to the plane XZ and passing through the center of each of the prisms that form the first polarization separator 22 and the second polarization separator 23.

In the present embodiment, the second wavelength converter 54 contains a red phosphor that emits red light when excited with light that belongs to the blue wavelength band. Specifically, the second wavelength converter 54 contains a YAG-based phosphor made, for example, of $(Y_{1-x},Gd_x)_3(Al, Ga)_5O_{12}$ in which any of Pr, Eu, and Cr is dispersed as an activator (any of Pr:YAG, Eu:YAG, and Cr:YAG). The activator may be one type selected from Pr, Eu, and Cr or may be a co-activator containing a plurality of types selected from Pr, Eu, and Cr. The second wavelength converter 54 emits in the direction +Z fluorescence that belongs to the red wavelength band formed of wavelengths longer than those in the blue wavelength band to which the excitation light ELs, which is incident on the second wavelength converter 54 along the direction −Z, belongs, that is, nonpolarized red light RL. The red light RL belongs, for example, to a wavelength band from 600 to 800 nm.

The red light RL in the present embodiment corresponds to the third light that belongs to a third wavelength band in the appended claims.

The red light RL emitted from the second wavelength converter 54 passes along the direction +Z through the third light collector 53, which parallelizes the red light RL, and the parallelized red light RL then enters the third polarization separator 52. An immobile wavelength converter is used as the second wavelength converter 54 in the present embodiment, and the configuration described above may be replaced with a configuration using a rotary wavelength converter including a rotator that rotates the second wavelength converter 54 around an axis of rotation parallel to the axis Z. In this case, an increase in temperature of the second wavelength converter 54 is suppressed, whereby the wavelength conversion efficiency of the second wavelength converter 54 can be increased.

The third polarization separation layer 521 of the third polarization separator 52 has the polarization separation characteristic that causes the third polarization separation layer 521 to reflect the S-polarized component of light that belongs to the red wavelength band and transmits the P-polarized component thereof, as described above. Therefore, out of the nonpolarized red light RL incident on the third polarization separation layer 521, red light RLs formed of the S-polarized component is reflected off the third polarization separation layer 521 in the direction −X and enters the first color separator 51. The color separation layer 511 of the first color separator 51 has the color separation characteristic that causes the color separation layer 511 to reflect light that belongs to the red wavelength band and transmit light that belongs to the blue wavelength band, as described above. The red light RLs incident on the color separation layer 511 along the direction −X is therefore reflected off the color separation layer 511 in the direction +Z and enters the light combiner 55.

On the other hand, out of the nonpolarized red light RL having entered the third polarization separation layer 521, red light RLp formed of the P-polarized component passes through the third polarization separation layer 521 in the direction +Z, exits out of the third polarization separation layer 521, and enters the fourth phase retarder 56.

The red light RLp formed of the P-polarized component in the present embodiment corresponds to the fifth polarization component in the appended claims, and the red light RLs formed of the S-polarized component in the present embodiment corresponds to the sixth polarization component in the appended claims.

Configuration of Fourth Phase Retarder

The fourth phase retarder 56 is disposed in a position shifted in the direction +Z from the third polarization separator 52. In other words, the fourth phase retarder 56 is disposed in the optical path of the red light RLp that exits out of the third polarization separator 52. The fourth phase retarder 56 is formed of a half wave plate for the red wavelength band to which the red light RLp incident on the fourth phase retarder 56 belongs. The fourth phase retarder 56 thus converts the red light RLp formed of the P-polarized component incident from the third polarization separator 52 into the red light RLs formed of the S-polarized component. The red light RLs converted by the fourth phase retarder 56 and therefore formed of the S-polarized component is outputted from the light source apparatus 2 in the direction +Z and enters the homogenizer 4 shown in FIG. 1. The fourth phase retarder 56 may instead be so provided as to be in contact with a surface of the third polarization separator 52 that is the surface via which the red light RLp exits.

Configuration of Second Color Separator

Figure 5:
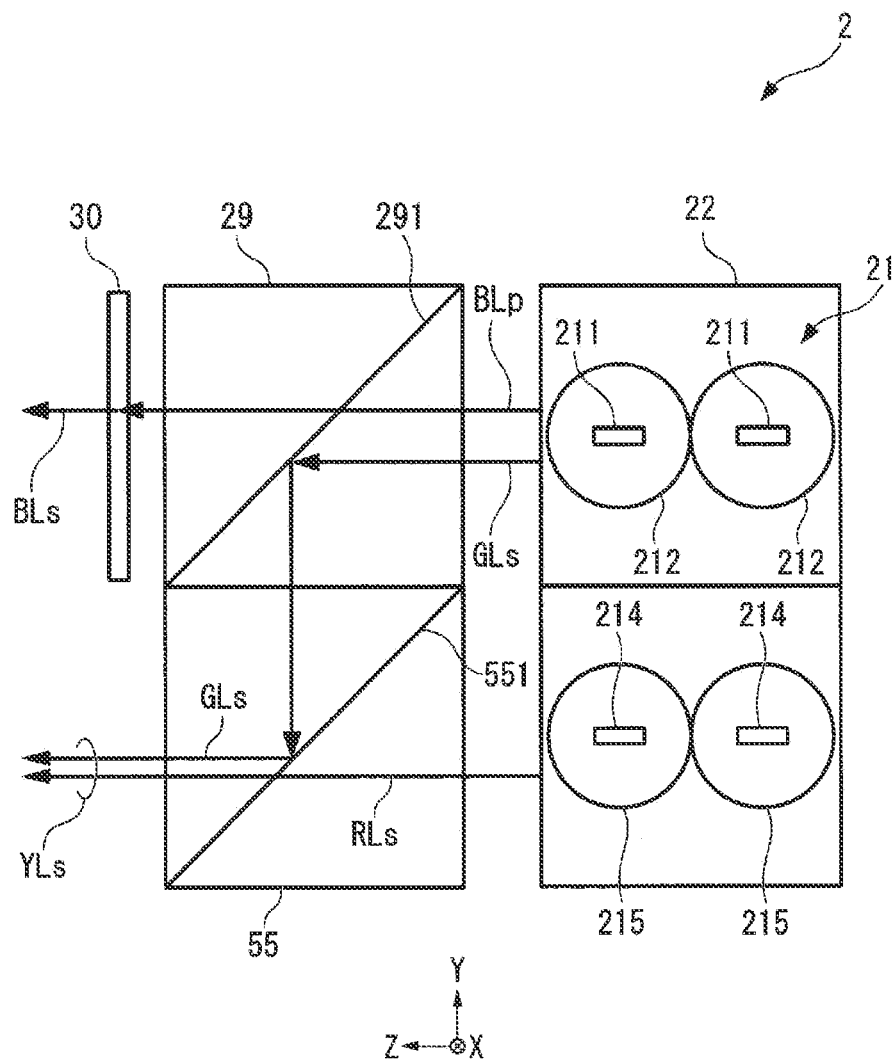
FIG. 5 is a side view of the light source apparatus viewed from the negative side of a direction X.

FIG. 5 is a side view of the light source apparatus 2 viewed from the negative side of direction X. That is, FIG. 5 shows the second color separator 29, the fifth phase retarder 30, the light combiner 55, and other components viewed from the negative side of the direction X. In FIG. 5, the rotary phase retardation apparatus 213, the second phase retarder 24, the first light collector 25, the diffusion apparatus 26, and other components are omitted for clarity of illustration.

The second color separator 29 is disposed in a position shifted in the direction +Z from the first polarization separator 22, as shown in FIG. 5. The second color separator 29 separates the light having exited in the direction +Z out of the first polarization separator 22 into the blue light BLp and the green light GLs. The second color separator 29 is formed of a dichroic prism including a color separation layer 291.

The dichroic prims has a substantially box-like shape that is the combination of two bases each formed of a substantially right-angled isosceles triangular column. The color separation layer 291 is provided along the interface between the two bases. The color separation layer 291 inclines by 45° with respect to the axes Y and Z. In other words, the color separation layer 291 inclines by 450 with respect to the planes XY and XZ. The color separation layer 291 functions as a dichroic mirror that transmits light that belongs to the blue wavelength band out of the light incident on the color separation layer 291 and reflects the green light out of color light that belongs to a wavelength band formed of wavelengths longer than those in the blue wavelength band.

Therefore, out of the light having entered the second color separator 29 from the first polarization separator 22, the blue light BLp passes through the color separation layer 291 in the direction +Z and exits out of the second color separator 29. On the other hand, out of the light having entered the second color separator 29 from the first polarization separator 22, the green light GLs is reflected off the color separation layer 291 in the direction −Y. The second color separator 29 may be formed of a dichroic mirror including the color separation layer 291 in place of the dichroic prism.

Configuration of Fifth Phase Retarder

The fifth phase retarder 30 is disposed in a position shifted in the direction +Z from the second color separator 29. In other words, the fifth phase retarder 30 is disposed in the optical path of the blue light BLp that exits out of the second color separator 29. The fifth phase retarder 30 is formed of a half wave plate for the blue wavelength band to which the blue light BLp incident on the fifth phase retarder 30 belongs. The fifth phase retarder 30 converts the blue light BLp incident from the second color separator 29 into the blue light BLs formed of the S-polarized component. The blue light BLs converted by the fifth phase retarder 30 and therefore formed of the S-polarized component is outputted from the light source apparatus 2 in the direction +Z and enters the homogenizer 4 shown in FIG. 1. The fifth phase retarder 30 may instead be so provided as to be in contact with a surface of the second color separator 29 that is the surface via which the blue light BLp exits.

Configuration of Light Combiner

The light combiner 55 is disposed in a position shifted in the direction −Y from the second color separator 29. The green light GLs reflected off the color separation layer 291 and the red light RLs reflected off the color separation layer 511 of the first color separator 51 enter the light combiner 55. The light combiner 55 is formed of a dichroic prism having a substantially box-like shape that is the combination of two bases each formed of a substantially right-angled isosceles triangular column. A light combining layer 551 is provided along the interface between the two bases. The light combining layer 551 inclines by 450 with respect to the directions +Y and +Z. In other words, the light combining layer 551 inclines by 45° with respect to the planes XY and XZ. The light combining layer 551 is disposed in parallel to the color separation layer 291.

The light combining layer 551 reflects light that belongs to the green wavelength band and transmits light that belongs to the red wavelength band. The light combining layer 551 therefore reflects the green light GLs that enters the light combining layer 551 in the direction −Y from the second color separator 29 in the direction +Z and transmits the red light RLs that enters from the first color separator 51 in the direction +Z. The green light GLs and the red light RLs are combined with each other into the yellow light YLs. The yellow light YLs is outputted from the light source apparatus 2 in the direction +Z and enters the homogenizer 4 shown in FIG. 1. The light combiner 55 may be formed of a dichroic mirror in place of the dichroic prism.

Configuration of Homogenizer

The homogenizer 4 homogenizes the illuminance in an image formation area of the light modulator 6 irradiated with the light outputted from the light source apparatus 2, as shown in FIG. 1. The homogenizer 4 includes a first multi-lens 41, a second multi-lens 42, and a superimposing lens 43.

The first multi-lens 41 includes a plurality of lenses 411 arranged in a matrix in a plane perpendicular to the center axis of the light L incident from the light source apparatus 2, that is, the illumination axis Ax. The plurality of lenses 411 of the first multi-lens 41 divide the light incident from the light source apparatus 2 into a plurality of sub-light fluxes.

Figure 6:
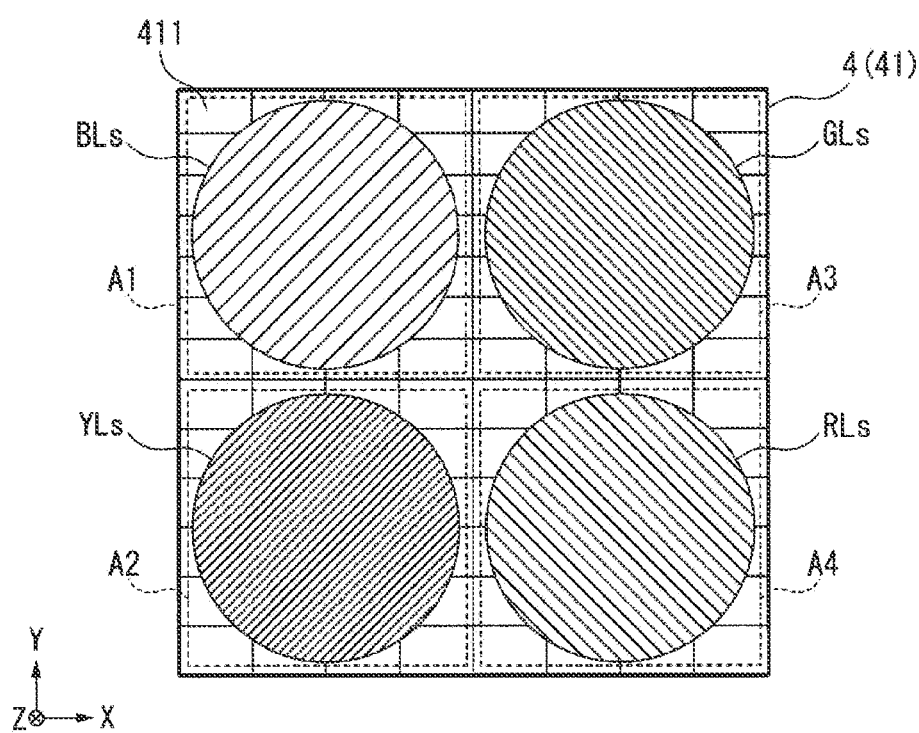
FIG. 6 is a diagrammatic view showing light incident positions on a multi-lens that are the positions where color light fluxes are incident on the multi-lens.

FIG. 6 is a diagrammatic view showing the light incident positions on the first multi-lens 41 viewed from the negative side of the direction Z that are the positions where the color light fluxes are incident on the first multi-lens 41.

The blue light BLs, the yellow light YLs, the green light GLs, and the red light RLs outputted from the light source apparatus 2 enter the first multi-lens 41, as shown in FIG. 6. The blue light BLs outputted via a position on the light source apparatus 2 that is a position shifted in the direction −X and the direction +Y enters a plurality of lenses 411 present in an area A1 of the first multi-lens 41 that is an area shifted in the direction −X and the direction +Y. The yellow light YLs outputted via a position on the light source apparatus 2 that is a position shifted in the direction −X and the direction −Y enters a plurality of lenses 411 present in an area A2 of the first multi-lens 41 that is an area shifted in the direction −X and the direction −Y.

The green light GLs outputted via a position on the light source apparatus 2 that is a position shifted in the direction +X and the direction +Y enters a plurality of lenses 411 present in an area A3 of the first multi-lens 41 that is an area shifted in the direction +X and the direction +Y. The red light RLs outputted via a position on the light source apparatus 2 that is a position shifted in the direction +X and the direction −Y enters a plurality of lenses 411 present in an area A4 of the first multi-lens 41 that is an area shifted in the direction +X and the direction −Y. The color light fluxes having entered the lenses 411 form a plurality of sub-light fluxes, which enter the lenses 421 of the second multi-lens 42 that correspond to the lenses 411.

Out of the light L outputted from the light source apparatus 2 according to the present embodiment, the blue light BLs corresponds to the first light in the appended claims, the yellow light YLs corresponds to light containing the second light in the appended claims, the green light GLs corresponds to the second light in the appended claims, and the red light RLs corresponds to the third light in the appended claims.

The second multi-lens 42 includes a plurality of lenses 421, which are arranged in a matrix in a plane perpendicular to the illumination optical axis Ax and correspond to the plurality of lenses 411 of the first multi-lens 41, as shown in FIG. 1. The lenses 421 receives the plurality of sub-light fluxes having exited out of the lenses 411 corresponding to the lenses 421. The lenses 421 cause the sub-light fluxes incident thereon to enter the superimposing lens 43.

The superimposing lens 43 superimposes the plurality of sub-light fluxes incident from the second multi-lens 42 on one another in the image formation area of the light modulator 6. In detail, the second multi-lens 42 and the superimposing lens 43 cause the blue light BLs, the yellow light YLs, the green light GLs, and the red light RLs each divided into the plurality of sub-light fluxes to enter a plurality of microlenses 621, which form a microlens array 62 of the light modulator 6, via the field lens 5 at different angles of incidence.

Configuration of Light Modulator

The light modulator 6 modulates the light outputted from the light source apparatus 2, as shown in FIG. 1. In detail, the light modulator 6 modulates the color light fluxes outputted from the light source apparatus 2 and entering the light modulator 6 via the homogenizer 4 and the field lens 5 in accordance with image information to form image light according to the image information. The light modulator 6 includes one liquid crystal panel 61 and one microlens array 62.

Configuration of Liquid Crystal Panel

Figure 7:
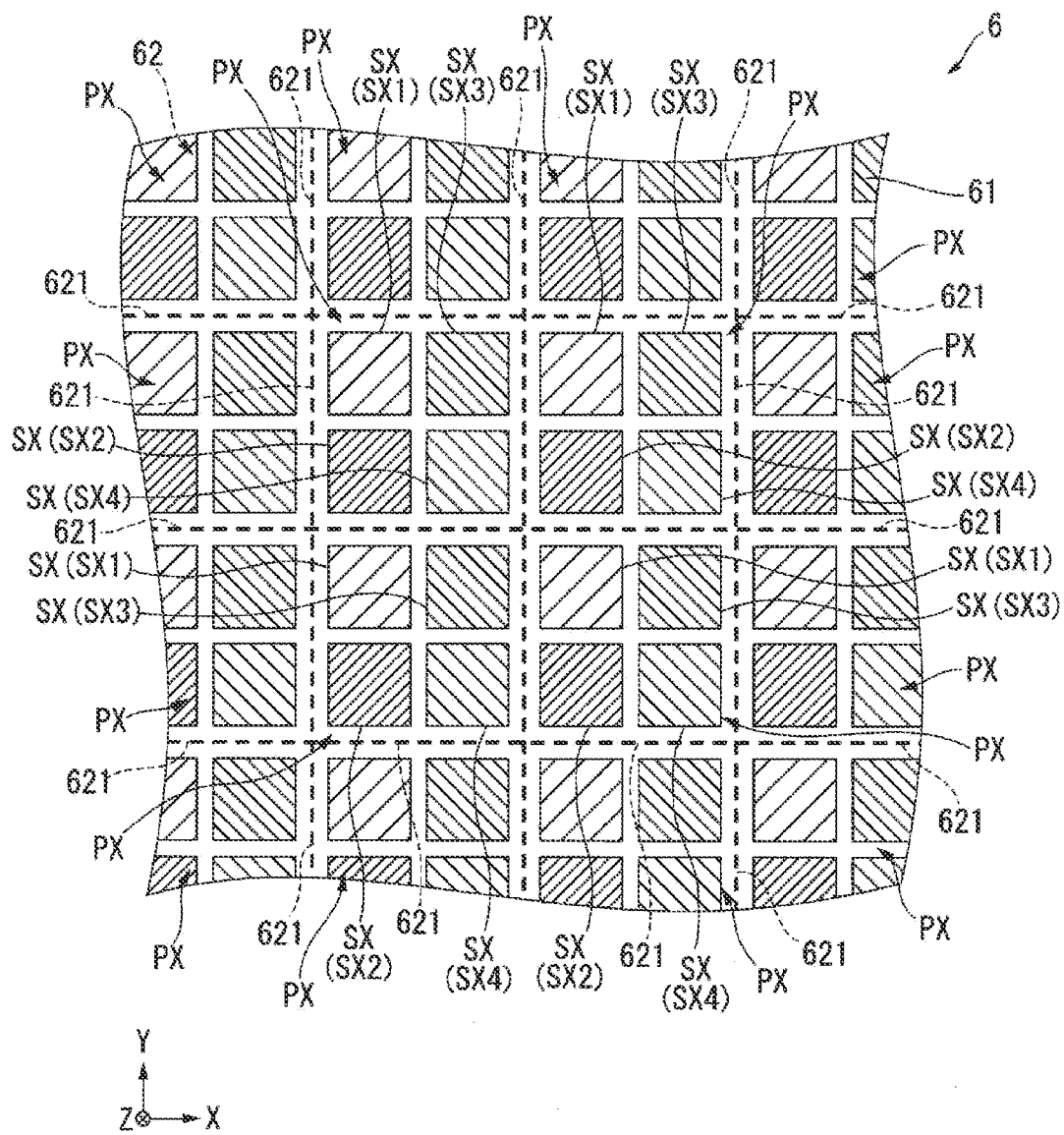
FIG. 7 is an enlarged view of a light modulator.

FIG. 7 is an enlarged diagrammatic view of part of the light modulator 6 viewed from the negative side of the direction Z. In other words, FIG. 7 shows the correspondence between pixels PX provided in the liquid crystal panel 61 and the microlenses 621 provided in the microlens array 62.

The liquid crystal panel 61 has a plurality of pixels PX arranged in a matrix in a plane perpendicular to the illumination optical axis Ax, as shown in FIG. 7.

The pixels PX each have a plurality of sub-pixels SX, which modulate color light fluxes having colors different from one another. In the present embodiment, the pixels PX each have four sub-pixels SX (SX1 to SX4). Specifically, in one pixel PX, the first sub-pixel SX1 is disposed in a position shifted in the direction −X and the direction +Y. The second sub-pixel SX2 is disposed in a position shifted in the direction −X and the direction −Y. The third sub-pixel SX3 is disposed in a position shifted in the direction +X and the direction +Y. The fourth sub-pixel SX4 is disposed in a position shifted in the direction +X and the direction −Y.

Configuration of Microlens Array

The microlens array 62 is provided on a side of the liquid crystal panel 61 that is the negative side of the direction Z, which is the light incident side, as shown in FIG. 1. The microlens array 62 guides the color light fluxes that enter the microlens array 62 to the individual pixels PX. The microlens array 62 includes the plurality of microlenses 621 corresponding to the plurality of pixels PX.

The plurality of microlenses 621 are arranged in a matrix in a plane perpendicular to the illumination optical axis Ax, as shown in FIG. 7. In other words, the plurality of microlenses 621 are arranged in a matrix in a plane perpendicular to the center axis of the light incident via the field lens 5. In the present embodiment, the microlenses 621 are each provided in correspondence with two sub-pixels arranged in the direction +X and two sub-pixels arranged in the direction +Y. That is, the microlenses 621 are each provided in correspondence with the four sub-pixels SX1 to SX4 in the form of a matrix formed of two rows and two columns in the plane XY.

The blue light BLs, the yellow light YLs, the green light GLs, and the red light RLs superimposed by the homogenizer 4 on one another enter the microlenses 621 at different angles of incidence. The microlenses 621 cause each of the color light fluxes incident thereon to be incident on the sub-pixels SX corresponding to the color light flux. Specifically, the microlenses 621 each cause, out of the sub-pixels SX of the corresponding pixel PX, the blue light BLs to be incident on the first sub-pixel SX1, the yellow light YLs to be incident on the second sub-pixel SX2, the green light GLs to be incident on the third sub-pixel SX3, and the red light RLs to be incident on the fourth sub-pixel SX4. The color light fluxes corresponding to the sub-pixels SX1 to SX4 are thus incident on the sub-pixels SX1 to SX4, and the sub-pixels SX1 to SX4 modulate the corresponding color light fluxes. The image light thus modulated by the liquid crystal panel 61 is projected by the projection optical apparatus 7 on the projection receiving surface that is not shown.

Effects of First Embodiment

In the projector of related art described in JP-A-4-60538, a lamp is used as the light source. Since the light outputted from the lamp has polarization directions that are not aligned with one another, a polarization conversion section for aligning the polarization directions with one another is required to use a liquid crystal panel as the light modulator. The projector typically uses a polarization conversion section including a multi-lens array and a polarization separator (PBS) array. To reduce the size of the projector, however, a multi-lens array and a PBS array each having a small interval are required, but it is very difficult to produce a PBS array having a small interval.

To solve the problem described above, in the present embodiment, the light source apparatus 2 outputs four color light fluxes having an aligned polarization direction, that is, the blue light BLs formed of the S-polarized component, the yellow light YLs formed of the S-polarized component, the green light GLs formed of the S-polarized component, and the red light RLs formed of the S-polarized component. According to the configuration described above, a light source apparatus 2 capable of outputting a plurality of color light fluxes that are spatially separate from one another and have an aligned polarization direction can be achieved without use of a polarization converter having a small interval, such as that described above. The size of the light source apparatus 2 and in turn the size of the projector 1 can thus be reduced.

Further, in the projector 1 according to the present embodiment, the yellow light YLs enters the light modulator 6 in addition to the blue light BLs, the green light GLs, and the red light RLs, whereby the luminance of an image projected from the projection optical apparatus 7 can be increased.

In the present embodiment, the light source section 21 includes the first phase retarder 2131, whereby the blue light BLp formed of the P-polarized component and the blue light BLs formed of the S-polarized component are reliably allowed to enter the first polarization separator 22. Further, according to the configuration described above, since the light fluxes outputted from the plurality of first light emitting devices 211 may have the same polarization direction, solid-state light sources of the same type may be disposed in the same orientation, whereby the configuration of the light source section 21 can be simplified.

In the present embodiment, since the first phase retarder 2131 is rotatable around an axis of rotation along the direction +X, adjustment of the angle of rotation of the first phase retarder 2131 allows adjustment of the ratio between the amount of blue light BLs and the amount of blue light BLp that enter the first polarization separator 22. The ratio between the amount of blue light BLs and the amount of green light GLs outputted from the light source apparatus 2 can thus be adjusted.

In the present embodiment, the second phase retarder 24 is provided between the first polarization separator 22 and the first light collector 25, whereby the circularly polarized blue light BLc2 outputted from the diffusion apparatus 26 can be converted into the blue light BLp formed of the P-polarized component, which can pass through the first polarization separation layer 221 of the first polarization separator 22. The blue light BLc2 outputted from the diffusion apparatus 26 can thus be used at increased efficiency.

In the present embodiment, the third phase retarder 32 is provided on the light exiting side of the second polarization separator 23, whereby the green light GLp formed of the P-polarized component that exits out of the second polarization separator 23 can be converted into the green light GLs formed of the S-polarized component. The fourth phase retarder 56 is provided on the light exiting side of the third polarization separator 52, whereby the red light RLp formed of the P-polarized component that exits out of the third polarization separator 52 can be converted into the red light RLs formed of the S-polarized component. The fifth phase retarder 30 is provided on the light exiting side of the second color separator 29, whereby the blue light BLp formed of the P-polarized component that exits out of the second color separator 29 can be converted into the blue light BLs formed of the S-polarized component. The blue light BLs, the yellow light YLs, the green light GLs, and the red light RLs outputted from the light source apparatus 2 can thus each be light formed of the S-polarized component.

In the present embodiment, the light source apparatus 2 includes the first light collector 25, which collects the blue light BLs into a spot on the diffusion apparatus 26, whereby the first light collector 25 can efficiently collect the blue light BLs having exited out of the second phase retarder 24 into a spot on the diffusion apparatus 26 and parallelize the blue light BLs outputted from the diffusion apparatus 26. As a result, loss of the blue light BLs can be suppressed, whereby the blue light BLs can be used at increased efficiency.

In the present embodiment, the light source apparatus 2 includes the second light collector 27, which collects the blue light BLp into a spot on the first wavelength converter 28, whereby the second light collector 27 can efficiently collect the blue light BLp having exited out of the second polarization separator 23 into a spot on the first wavelength converter 28 and parallelize the green light GL emitted from the first wavelength converter 28. As a result, loss of the blue light BLp and the green light GL can be suppressed, whereby the blue light BLp and the green light GL can be used at increased efficiency.

In the present embodiment, the light source apparatus 2 includes the third light collector 53, which collects the excitation light ELs into a spot on the second wavelength converter 54, whereby the third light collector 53 can efficiently collect the excitation light ELs having exited out of the third polarization separator 52 into a spot on the second wavelength converter 54 and parallelize the red light RL emitted from the second wavelength converter 54. As a result, loss of the excitation light ELs and the red light RL can be suppressed, whereby the excitation light ELs and the red light RL can be used at increased efficiency.

As the light source apparatus capable of outputting four color light fluxes to be incident on the light modulator, that is, blue light, yellow light, green light, and red light, a light source apparatus having the configuration described below is conceivable in addition to the light source apparatus having the configuration according to the present embodiment. A conceivable example of such a light source apparatus may be configured to include one wavelength converter containing a phosphor that produces yellow light when irradiated with the blue light, separate part of the yellow light in terms of color to produce green light and red light, and output the four color light fluxes, the blue light, the yellow light, the green light, and the red light. The light source apparatus based on the scheme described above is referred to as a light source apparatus according to Comparative Example.

In the light source apparatus according to Comparative Example, an yttrium-aluminum-garnet-based (YAG-based) phosphor containing cerium (Ce) as the activator, for example, is typically used as the phosphor that outputs the yellow light. When a YAG phosphor is used, however, a large amount of heat generated when the light is emitted causes a problem of a decrease in wavelength conversion efficiency when the YAG phosphor cannot be sufficiently cooled. Further, the yellow light produced by the YAG phosphor tends to slightly lack the red wavelength band component. The problems described above make it difficult in some cases using the light source apparatus according to Comparative Example to achieve a projector that outputs a bright image that excels in color reproducibility.

To solve the problems described above, the light source apparatus 2 according to present embodiment uses the first wavelength converter 28, which outputs the green light, and the second wavelength converter 54, which outputs the red light, whereby the wavelength converters 28 and 54 can be efficiently cooled for an increase in the wavelength conversion efficiency as a whole, as compared with that of the light source apparatus according to Comparative Example. Further, separately adjusting the electric power supplied to the first light emitters 211 and the electric power supplied to the second light emitters 214 allows the amount of green light and the amount of red light can be independently controlled. A projector 1 that outputs a bright image that excels in color reproducibility can thus be achieved.

In the present embodiment, in which the projector 1 includes the homogenizer 4 located between the light source apparatus 2 and the light modulator 6, the light modulator 6 can be substantially uniformly illuminated with the blue light BLs, the yellow light YLs, the green light GLs, and the red light RLs outputted from the light source apparatus 2. Color and luminance unevenness in a projected image can thus be suppressed.

Further, in the present embodiment, in which the light modulator 6 includes the microlens array 62 including the plurality of microlenses 621 corresponding to the plurality of pixels PX, the microlenses 621 allow the four color light fluxes that enter the light modulator 6 to be incident on the corresponding four sub-pixels SX of the liquid crystal panel 61. The color light fluxes outputted from the light source apparatus 2 can thus be efficiently incident on the sub-pixels SX, whereby the color light fluxes can be used at increased efficiency.

Second Embodiment

A second embodiment of the present disclosure will be described below with reference to FIGS. 8 and 9.

The basic configuration of a light source apparatus according to the second embodiment is the same as that in the first embodiment, and the configurations of the second light emitters and the second wavelength converter differ from those in the first embodiment. The entire light source apparatus will therefore not be described.

Figure 8:
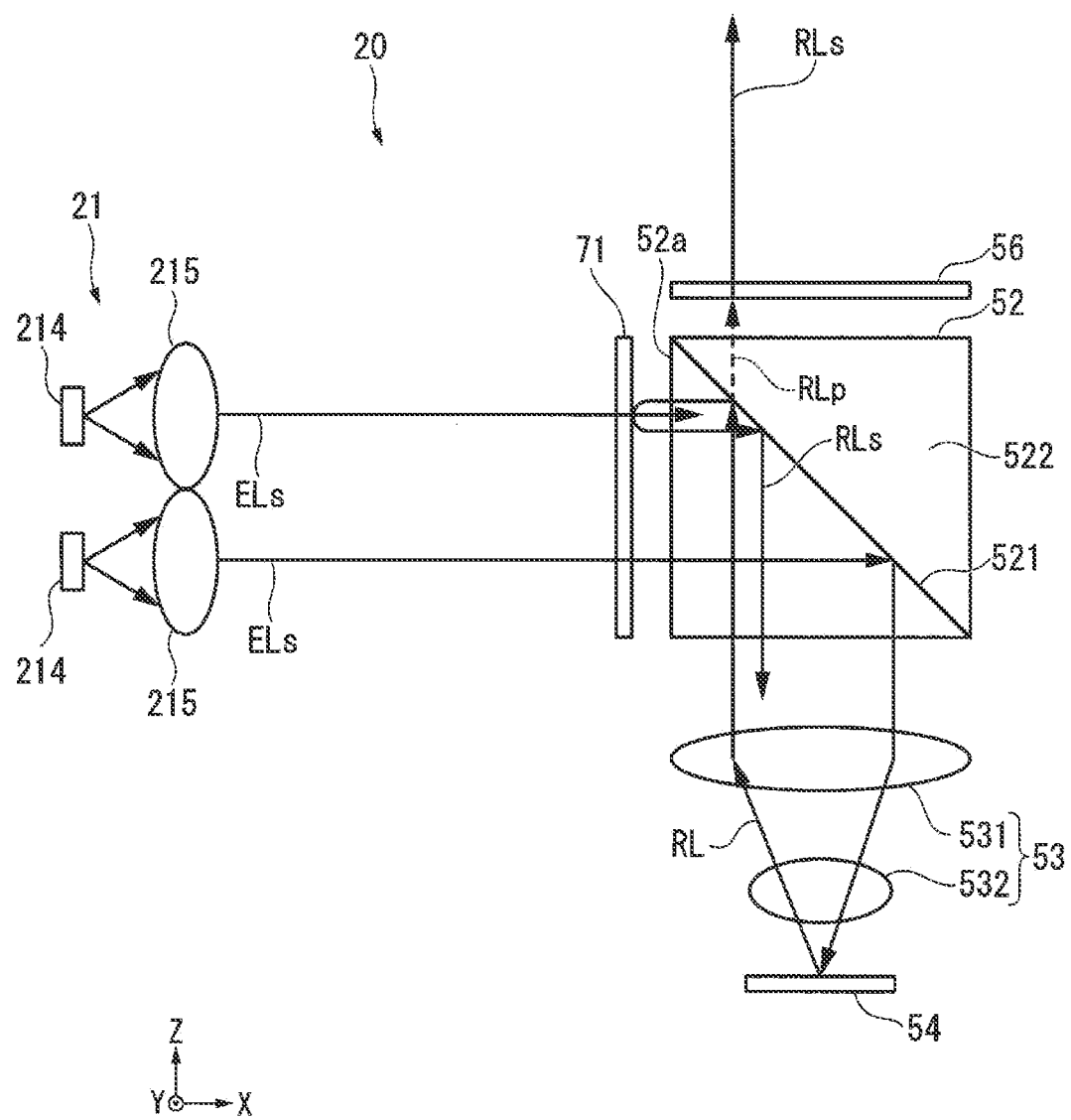
FIG. 8 is a plan view of components of a light source apparatus according to a second embodiment that are located along the path of the light from the second light emitters and viewed from the positive side of the direction Y.

FIG. 8 is a plan view of the components of the light source apparatus according to the second embodiment that are located along the path of the light from the second light emitters, that is, the components on the lower side viewed from the positive side of the direction Y. FIG. 9 is a side view of the light source apparatus viewed from the negative side of the direction X.

Figure 9:
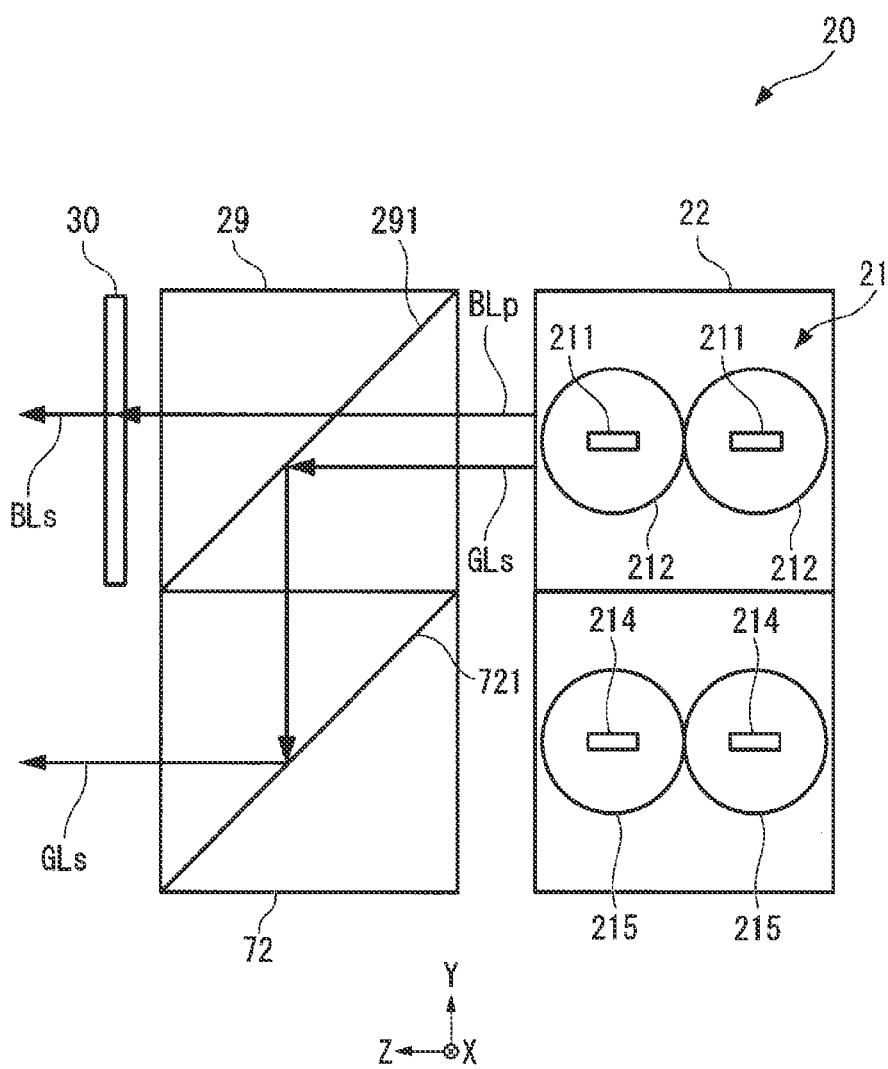
FIG. 9 is a side view of the light source apparatus viewed from the negative side of the direction X.

In FIGS. 8 and 9, components common to those in the figures used in the first embodiment have the same reference characters and will not be described.

Configuration of Reflector

A light source apparatus 20 according to the present embodiment includes a reflector 71 in place of the first color separator 51 (see FIG. 4) in the light source apparatus 2 according to the first embodiment, as shown in FIG. 8. Specifically, the reflector 71 is so disposed in a position shifted in the direction −X from the third polarization separator 52 as to be parallel to a surface 52a of the third polarization separator 52 that is the surface via which the red light RLs exits. The reflector 71 is formed of a dichroic mirror having a color separation characteristic that causes the reflector 71 to transmit light that belongs to the blue wavelength band and reflects light that belongs to the red wavelength band.

The light source apparatus 20 according to the present embodiment includes a reflection prism 72 in place of the light combiner 55 (see FIG. 5) in the light source apparatus 2 according to the first embodiment, as shown in FIG. 9. That is, the reflection prism 72 is disposed in a position shifted in the direction −Y from the second color separator 29. The reflection prism 72 is formed of a prism having a substantially box-like shape that is the combination of two bases each formed of a substantially right-angled isosceles triangular column. A reflection layer 721 is provided along the interface between the two bases. The reflection layer 721 may be so characterized as to reflect light that belongs to the entire visible wavelength band or reflect light that belongs to the green wavelength band. The reflection prism 72 may be replaced with a plate-shaped reflection mirror. The configurations of the light source apparatus 20 and other components are the same as those in the first embodiment.

In the light source apparatus 20 according to the present embodiment, the red light RLs formed of the S-polarized component out of the red light RL having exited out of the second wavelength converter 54 is reflected off the third polarization separation layer 521 of the third polarization separator 52 and is incident on the reflector 71. Since the reflector 71 is so characterized as to reflect light that belongs to the red wavelength band, the red light RLs is reflected off the reflector 71.

The red light RLs reflected off the reflector 71 is reflected off the third polarization separation layer 521 of the third polarization separator 52 and enters the second wavelength converter 54 via the third light collector 53. The red phosphor contained in the second wavelength converter 54 hardly absorbs an externally incident red light component. The red light RLs having entered the second wavelength converter 54 is therefore not absorbed in the second wavelength converter 54 but repeatedly reflected or scattered therein to form nonpolarized red light RL.

The nonpolarized red light RL exits, along with the red light RL newly produced in the red phosphor, out of the second wavelength converter 54 again. The red light RL having exited out of the second wavelength converter 54 enters the third polarization separator 52 via the third light collector 53, as described above. The red light RLp formed of the P-polarized component out of the red light RL having entered the third polarization separator 52 passes through the third polarization separation layer 521 and exits out of the light source apparatus 20.

In the present embodiment, in which the reflector 71 is so provided as to face the surface 52a of the third polarization separator 52, the red light RL does not travel beyond the reflector 71 in the direction −X. There is therefore no light that enters the reflection prism 72 in the direction −Z, as shown in FIG. 9, unlike in the light source apparatus 2 according to the first embodiment. Only the green light GLs reflected off the color separation layer 291 of the second color separator 29 enters the reflection prism 72, is reflected off the reflection layer 721, and exits out of the light source apparatus 20. As described above, in the light source apparatus 20 according to the present embodiment, the green light GLs is incident, in place of the yellow light YLs, on a position on the first multi-lens array 41 that is the position shown in FIG. 6 on which the yellow light YLs is incident.

The green light GLs is incident on the second sub-pixel SX2 of each of the pixels PX, as the yellow light YLs is in the first embodiment.

Effects of Second Embodiment

Also in the present embodiment, the same effects as those of the first embodiment are provided, for example, a light source apparatus 20 capable of outputting a plurality of color light fluxes having an aligned polarization direction can be achieved without use of a polarization converter having a small interval, the size of the light source apparatus 20 and the size of the projector 1 can be reduced, and a projector that outputs a bright image that excels in color reproducibility can be achieved.

Further, in the light source apparatus 20 according to the second embodiment, the red light RLs temporarily reflected off the reflector 71 returns to the second wavelength converter 54, which converts the red light RLs into nonpolarized red light RL, and when the red light RL enters the third polarization separator 52 again, the red light RLp formed of the P-polarized component passes through the third polarization separation layer 521. As described above, part of the red light RLs temporarily reflected off the reflector 71 can be reused to form light that contributes to the illumination.

Third Embodiment

A third embodiment of the present disclosure will be described below with reference to FIG. 10.

Figure 10:
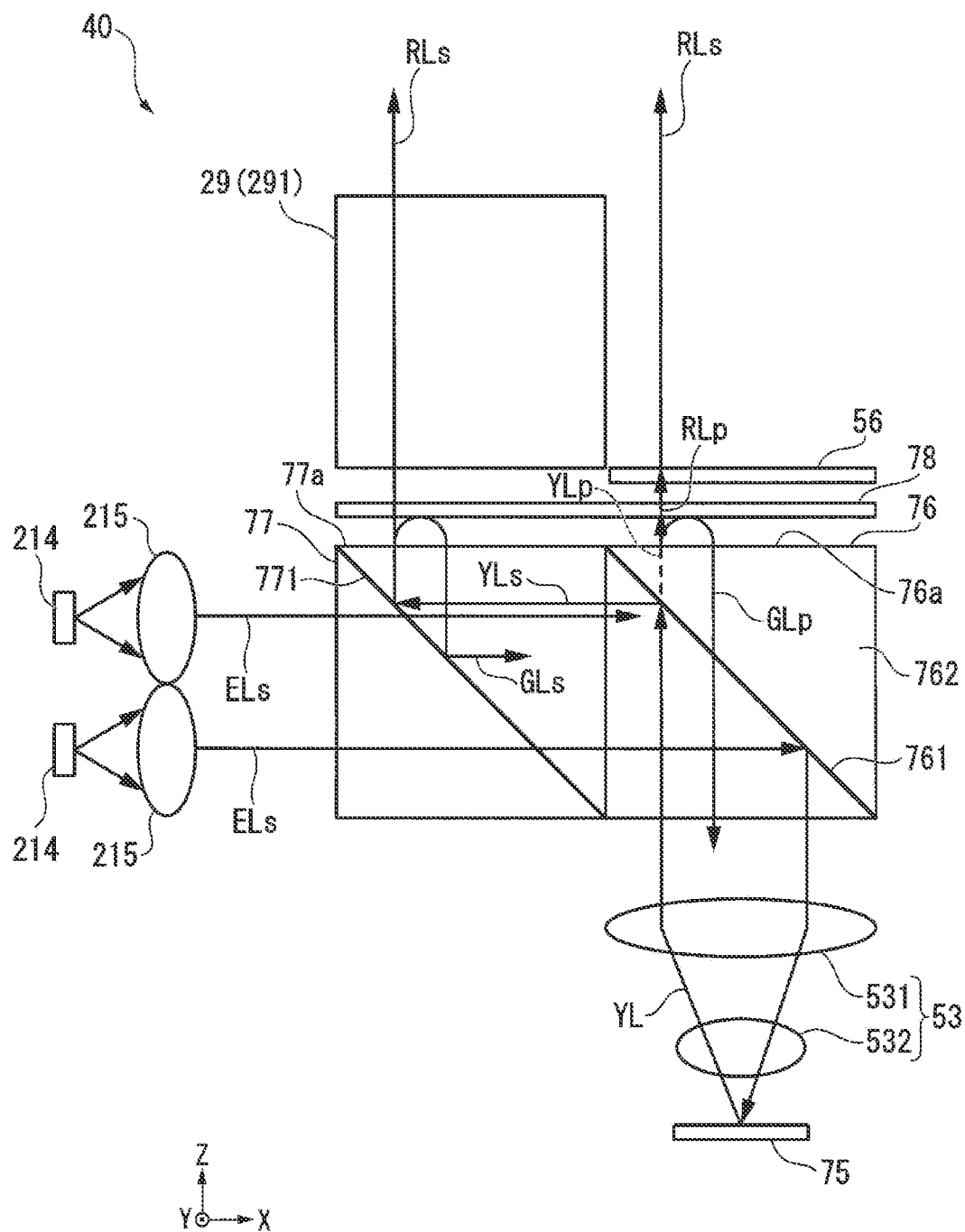
FIG. 10 is a plan view of components of a light source apparatus according to a third embodiment that are located along the path of the light from the second light emitters and viewed from the positive side of the direction Y.

FIG. 10 is a plan view of the components of the light source apparatus according to the third embodiment that are located along the path of the light from the second light emitters, that is, the components on the lower side viewed from the positive side of the direction Y.

In FIG. 10, components common to those in the figures used in the first embodiment have the same reference characters and will not be described.

A light source apparatus 40 according to the present embodiment includes, in place of the second wavelength converter 54 in the light source apparatus 2 according to the first embodiment, a second wavelength converter 75, which outputs light having a color different from the color of the light outputted by the second wavelength converter 54 in the first embodiment, as shown in FIG. 10. Specifically, the second wavelength converter 75 provided in the light source apparatus 40 according to the present embodiment outputs the yellow light YL. The light source apparatus 40 according to the present embodiment further includes a third color separator 77 in place of the first color separator 51 in the light source apparatus 2 according to the first embodiment.

Configuration of Second Wavelength Converter

The second wavelength converter 75 in the present embodiment contains a yellow phosphor that emits light that belongs to a yellow wavelength band when excited with light that belongs to the blue wavelength band. Specifically, the second wavelength converter 75 contains an yttrium-aluminum-garnet-based (YAG-based) phosphor containing cerium (Ce) as the activator. The second wavelength converter 75 emits in the direction +Z fluorescence that belongs to the yellow wavelength band formed of wavelengths longer than those in the blue wavelength band to which the excitation light ELs, which is incident on the second wavelength converter 75 along the direction −Z, belongs, that is, nonpolarized yellow light YL. The yellow light YL belongs, for example, to a wavelength band from 500 to 700 nm. The yellow light YL contains the green light component and the red light component with the color light components each being the mixture of the S-polarized component and the P-polarized component.

The yellow light YL in the present embodiment corresponds to the third light in the appended claims.

Configuration of Third Polarization Separator

The third polarization separator 76 includes a third polarization separation layer 761 and two third bases 762, which are so provided as to sandwich the third polarization separation layer 761. The third polarization separation layer 761 has a wavelength selective polarization separation characteristic that causes the third polarization separation layer 761 to reflect light that belongs to the blue wavelength band irrespective of the polarization state of the light and transmit the P-polarized component and reflect the S-polarized component of light that belongs to the yellow wavelength band. The third polarization separator 76 therefore reflects in the direction −Z the excitation light ELs formed of the S-polarized component incident from the third color separator 77, which will be described later, transmits yellow light YLp formed of the P-polarized component in the direction +Z out of the yellow light YL incident from the second wavelength converter 75, and reflects the yellow light YLs formed of the S-polarized component in the direction −X out of the yellow light YL incident from the second wavelength converter 75.

The yellow light YLp in the present embodiment corresponds to the fifth polarized component in the appended claims, and the yellow light YLs in the present embodiment corresponds to the sixth polarized component in the appended claims.

Configuration of Third Color Separator

The third color separator 77 is disposed in a position shifted in the direction −X from the third polarization separator 76. That is, the third color separator 77 is disposed in the optical path of the excitation light ELs between the second light emitters 214 and the third polarization separator 76. The third color separator 77 is formed of a dichroic prism including a color separation layer 771. The color separation layer 771 functions as a dichroic mirror that transmits light that belongs to the blue wavelength band and reflects yellow light that belongs to a wavelength band formed of wavelengths longer than those in the blue wavelength band. Therefore, the excitation light ELs outputted from the second light emitters 214 passes through the color separation layer 771 in the direction +X, and the yellow light YLs having exited out of the third polarization separator 76 is reflected off the color separation layer 771 in the direction +Z.

Configuration of Fourth Color Separator

The fourth color separator 78 is so provided in a position shifted in the direction +Z from the third polarization separator 76 and the third color separator 77 as to face a light exiting surface 76a of the third polarization separator 76 and a light exiting surface 77a of the third color separator 77. The fourth color separator 78 is formed of a dichroic mirror having a color separation characteristic that causes the fourth color separator 78 to transmit light that belongs to the red wavelength band and reflect light that belongs to the green wavelength band. The fourth color separator 78 includes portions facing the third polarization separator 76 and the third color separator 77 and integrated with each other, and the portion facing the third polarization separator 76 and the portion facing the third color separator 77 may instead be separate from each other.

Configuration of Fourth Phase Retarder

The fourth phase retarder 56 is so provided as to face the light exiting surface 76a of the third polarization separator 76. The fourth color separator 78 is disposed between the fourth phase retarder 56 and the light exiting surface 76a of the third polarization separator 76.

In the light source apparatus 40 according to the present embodiment, the yellow light YLp formed of the P-polarized component having passed through the third polarization separation layer 761 of the third polarization separator 76 enters the fourth color separator 78. Out of the yellow light YLp formed of the P-polarized component, the red light RLp formed of the P-polarized component passes through the fourth color separator 78 and enters the fourth phase retarder 56. On the other hand, the green light GLp formed of the P-polarized component is reflected off the fourth color separator 78, passes through the third polarization separation layer 761 of the third polarization separator 76, and returns to the second wavelength converter 75 via the third light collector 53. Part of the green light GLp having returned to the second wavelength converter 75 is converted into the yellow light YL, which contributes as the excitation light, as described above.

On the other hand, the yellow light YLs formed of the S-polarized component reflected off the third polarization separation layer 761 of the third polarization separator 76 is reflected off the color separation layer 771 of the third color separator 77 and enters the fourth color separator 78. Out of the yellow light YLs formed of the S-polarized component, the red light RLs formed of the S-polarized component passes through the fourth color separator 78. That is, the light source apparatus 40 according to the present embodiment has a configuration in which the second wavelength converter 75 containing the yellow phosphor is used to extract the red light RLs. On the other hand, the green light GLs formed of the S-polarized component is reflected off the fourth color separator 78, is reflected off the third polarization separation layer 761 of the third polarization separator 76, and returns to the second wavelength converter 75 via the third light collector 53. Part of the green light GLs having returned to the second wavelength converter 75 is converted into the yellow light YL, which contributes as the excitation light.

In the present embodiment, the second wavelength converter 75 containing the yellow phosphor is used, and the red light RLs exits out of the third color separator 77 in the direction +Z. Therefore, although not shown, the behavior of the red light RLs that exits out of the third color separator 77 in the direction +Z is the same as that in the light source apparatus 2 according to the first embodiment. That is, the red light RLs that exits out of the third color separator 77 in the direction +Z and the green light GLs that exits out of the second color separator 29 in the direction −Y are combined with each other by the light combiner 55, as shown in FIG. 5. As a result, the yellow light YLs exits out of the light combiner 55. The arrangement of the colors of the four color light fluxes is therefore the same as that in the light source apparatus 2 according to the first embodiment shown in FIG. 6.

Effects of Third Embodiment

Also in the present embodiment, the same effects as those of the first embodiment are provided, for example, a light source apparatus 40 capable of outputting a plurality of color light fluxes having an aligned polarization direction can be achieved without use of a polarization converter having a small interval, the size of the light source apparatus 40 and the size of the projector 1 can be reduced, and a projector that outputs a bright image that excels in color reproducibility can be achieved.

The technical range of the present disclosure is not limited to the embodiments described above, and a variety of changes can be made to the embodiments to the extent that the changes do not depart from the substance of the present disclosure.

For example, in the first embodiment, the position via which the yellow light YLs exits out of the light combiner is a position shifted in the direction −Y from the position via which the blue light BLs exits out of the second polarization separator, and the position via which the red light RLs exits out of the third polarization separator is a position shifted in the direction −Y from the position via which the green light GLs exits out of the second polarization separator. In place of the arrangement described above, the position via which the yellow light YLs exits out of the light combiner may be a position shifted in the direction +Y from the position via which the blue light BLs exits out of the second polarization separator, and the position via which the red light RLs exits out of the third polarization separator may be a position shifted in the direction +Y from the position via which the green light GLs exits out of the second polarization separator. That is, the components on the upper side of the light source apparatus and the components on the lower side thereof may be reversed.

In each of the embodiments described above, the P-polarized component corresponds to the first polarization component, and the S-polarized component corresponds to the second polarization component, but not necessarily. The S-polarized component may be the first polarization component, and the P-polarized component may be the second polarization component. For example, the first polarization separator 22 may reflect the blue light BLp formed of the P-polarized component, which is the second polarization component, transmit the blue light BLs formed of the S-polarized component, which is the first polarization component, and reflect the yellow light YLs formed of the S-polarized component, which is the second polarization component.

The light source apparatuses 2, 20, and 40 according to the embodiments described above each include the first light collector 25, the second light collector 27, and the third light collector 53, but not necessarily. At least one of the first light collector 25, the second light collector 27, and the third light collector 53 may not be provided.

In each of the embodiments described above, the light source section 21 outputs the blue light BLs and the blue light BLp in the direction +X, but not necessarily. The light source section 21 may output the blue light BLs and the blue light BLp in a direction that intersects the direction +X, cause the blue light BLs and the blue light BLp to be reflected off, for example, using a reflection member, and then cause the blue light BLs and the blue light BLp to travel in the direction +X and enter the first polarization separator 22.

In each of the embodiments described above, the projector includes the homogenizer 4 including the first multi-lens 41, the second multi-lens 42, and the superimposing lens 43. In place of the configuration described above, a homogenizer having another configuration may be provided, or the homogenizer 4 may not be provided.

The light source apparatuses 2, 20, and 40 according to the embodiments described above output the color light fluxes via four light exiting positions, and the liquid crystal panel 61, which forms the light modulator 6, has four sub-pixels SX in each of the pixels PX. In place of the configuration described above, the light source apparatuses may each output three color light fluxes, and the liquid crystal panel may have three sub-pixels in each of the pixels. In this case, for example, in the light source apparatus according to each of the embodiments described above, a total reflection member may be provided in the optical path of the yellow light YLs.

The light source apparatuses 2 and 40 according to the first and third embodiments output the blue light BLs, the yellow light YLs, the green light GLs, and the red light RLs, which are each S-polarized light and are spatially separate from one another. The light source apparatus 20 according to the second embodiment outputs the blue light BLs, the green light GLs, and the red light RLs, which are each S-polarized light and are spatially separate from one another. In place of the configurations described above, the color light fluxes outputted by each of the light source apparatuses may have another polarization state. For example, the light source apparatuses may each be configured to output a plurality of color light fluxes that are each P-polarized light and are spatially separate from one another. The color light fluxes outputted by each of the light source apparatuses are not limited to blue light, yellow light, green light, or red light and may be other color light fluxes. For example, the light source apparatuses may each be configured to output white light in place of the blue light and the yellow light.

In addition to the above, the specific shape, number, arrangement, material, and other factors of each component of the light source apparatuses and the projector are not limited to those in the embodiments described above and can be changed as appropriate. Further, the above embodiments have been described with reference to the case where the light source apparatuses according to the present disclosure are each incorporated in a projector, but not necessarily. The light source apparatus according to each aspect of the present disclosure may be used as a lighting instrument, a headlight of an automobile, and other components.

What is claimed is:

1. A light source apparatus comprising:
    a light source section that outputs first light that belongs to a first wavelength band and excitation light that belongs to an excitation wavelength band;
    a first polarization separator that transmits in a first direction a first polarization component of the first light incident from the light source section along the first direction and reflects a second polarization component of the first light in a second direction that intersects the first direction;
    a second polarization separator that is disposed in a position shifted in the first direction from the first polarization separator and reflects in the second direction the first polarization component incident from the first polarization separator along the first direction;
    a diffuser that is disposed in a position shifted in the second direction from the first polarization separator, diffuses the second polarization component incident from the first polarization separator along the second direction, and causes the diffused second polarization component to exit in a third direction opposite the second direction;
    a first wavelength converter that is disposed in a position shifted in the second direction from the second polarization separator, converts a wavelength of the first polarization component incident from the second polarization separator along the second direction into second light that belongs to a second wavelength band different from the first wavelength band, and causes the second light to exit in the third direction; and
    a second wavelength converter that is disposed in a position shifted in a fifth direction that intersects the first direction, the second direction, the third direction, and a fourth direction opposite the first direction from a placement plane where the first polarization separator and the second polarization separator are placed, converts a wavelength of the excitation light outputted from the light source section into third light that belongs to a third wavelength band different from the first and second wavelength bands, and causes the third light to exit in the third direction,
    wherein the second polarization separator transmits the first polarization component of the second light in the third direction and reflects the second polarization component of the second light in the fourth direction.

2. The light source apparatus according to claim 1, further comprising:
    a third polarization separator that is disposed in a position shifted in the third direction from the second wavelength converter, transmits a fifth polarization component of the third light in the third direction, and reflects a sixth polarization component of the third light in the fourth direction; and
    a first color separator that is disposed in a position shifted in the fourth direction from the third polarization separator, transmits the excitation light outputted from the light source section, and reflects the sixth polarization component that exits out of the third polarization separator.

3. The light source apparatus according to claim 2, further comprising a second color separator that is disposed in a position shifted in the third direction from the first polarization separator and separates the light that exits out of the first polarization separator into the second polarization component that belong to the first wavelength band and the fourth polarization component that belong to the second wavelength band.

4. The light source apparatus according to claim 3, further comprising a light combiner that is disposed in a position shifted in the fifth direction from the second color separator, combines the fourth polarization component that exits out of the second color separator and the sixth polarization component that exits out of the first color separator, and outputs light containing the second light.

5. The light source apparatus according to claim 1, wherein the light source section includes a first light emitter that outputs the first light that belongs to the first wavelength band and a second light emitter that outputs the excitation light that belongs to the excitation wavelength band.

6. The light source apparatus according to claim 5, wherein the first wavelength band and the excitation wavelength band are the same wavelength band.

7. The light source apparatus according to claim 5, wherein the light source section further includes a first phase retarder on which the first light outputted from the first light emitter is incident and via which the first light containing the first polarization component and the second polarization component exits.

8. The light source apparatus according to claim 7, wherein the first phase retarder is rotatable around an axis of rotation along a traveling direction of the light incident on the first phase retarder.

9. The light source apparatus according to claim 1, further comprising a second phase retarder which is provided between the first polarization separator and the diffuser and on which the second polarization component is incident from the first polarization separator.

10. The light source apparatus according to claim 1, further comprising a third phase retarder that converts the third polarization component that exits out of the second polarization separator in the third direction into the fourth polarization component.

11. A projector comprising:
   the light source apparatus according to claim 1;
   a light modulator that modulates light from the light source apparatus in accordance with image information; and
   a projection optical apparatus that projects the light modulated by the light modulator.

12. The projector according to claim 11,
   further comprising a homogenizer provided between the light source apparatus and the light modulator,
   wherein the homogenizer includes
   two multi-lenses that divide the light incident from the light source apparatus into a plurality of sub-light fluxes, and
   a superimposing lens that superimposes the plurality of sub-light fluxes incident from the two multi-lenses on one another on the light modulator.

13. The projector according to claim 12,
   wherein the light modulator has a plurality of pixels,
   the plurality of pixels each have a first sub-pixel, a second sub-pixel, a third sub-pixel, and a fourth sub-pixel, and
   the first light is incident on the first sub-pixel, light containing the second light is incident on the second sub-pixel, the second light is incident on the third sub-pixel, and the third light is incident on the fourth sub-pixel in each of the plurality of pixels.

\* \* \* \* \*